US012528073B2

(12) United States Patent
McDaniel et al.

(10) Patent No.: US 12,528,073 B2
(45) Date of Patent: Jan. 20, 2026

(54) CHROMIUM-CATALYZED REACTIONS OF CARBON MONOXIDE WITH HYDROCARBONS IN THE PRESENCE OF UV LIGHT

(71) Applicant: Chevron Phillips Chemical Company LP, The Woodlands, TX (US)

(72) Inventors: Max P. McDaniel, Bartlesville, OK (US); Mitchell D. Refvik, Bartlesville, OK (US); Jeremy M. Praetorius, Bartlesville, OK (US); Kathy S. Clear, Bartlesville, OK (US); Jared L Barr, Bartlesville, OK (US); Carlos A. Cruz, Kingwood, TX (US); Masud M. Monwar, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 325 days.

(21) Appl. No.: 18/295,302

(22) Filed: Apr. 4, 2023

(65) Prior Publication Data
US 2023/0321634 A1    Oct. 12, 2023

Related U.S. Application Data

(60) Provisional application No. 63/327,834, filed on Apr. 6, 2022.

(51) Int. Cl.
*B01J 23/26* (2006.01)
*B01J 21/08* (2006.01)
*B01J 35/40* (2024.01)
*C07C 29/48* (2006.01)
*C07C 45/28* (2006.01)
*C07D 307/33* (2006.01)
*C08F 10/02* (2006.01)
*C08G 63/08* (2006.01)

(52) U.S. Cl.
CPC .............. *B01J 23/26* (2013.01); *B01J 21/08* (2013.01); *B01J 35/40* (2024.01); *C07C 29/48* (2013.01); *C07C 45/28* (2013.01); *C07D 307/33* (2013.01); *C08F 10/02* (2013.01); *C08G 63/08* (2013.01)

(58) Field of Classification Search
USPC .................................................. 568/342, 387
See application file for complete search history.

(56) References Cited

U.S. PATENT DOCUMENTS

| | | | | |
|---|---|---|---|---|
| 4,996,384 A | * | 2/1991 | Pelrine | B01J 38/12 585/10 |
| 6,160,183 A | * | 12/2000 | Druliner | B01J 23/52 568/360 |
| 7,294,599 B2 | | 11/2007 | Jensen | |
| 7,601,665 B2 | | 10/2009 | Mcdaniel | |
| 7,884,163 B2 | | 2/2011 | Mcdaniel | |
| 8,309,485 B2 | | 11/2012 | Yang | |
| 8,623,973 B1 | | 1/2014 | Mcdaniel | |
| 8,703,886 B1 | | 4/2014 | Yang | |
| 9,023,959 B2 | | 5/2015 | Mcdaniel | |
| 2020/0086307 A1 | | 3/2020 | Monwar | |
| 2020/0087430 A1 | | 3/2020 | Clear | |
| 2021/0078927 A1 | | 3/2021 | Mcdaniel | |

FOREIGN PATENT DOCUMENTS

| | | |
|---|---|---|
| WO | 2020060888 A2 | 3/2020 |
| WO | 2021055270 A1 | 3/2021 |
| WO | 2022260947 A1 | 12/2022 |

OTHER PUBLICATIONS

Partial Search Report issued in PCT application No. PCT/US2023/065317, mailed on Jun. 26, 2023, 3 pp.
Fairlie David P. et al, "Homogeneous catalysis. Conversion of 4-pentenals to cyclopentanones by efficient rhodium-catalyzed hydroacylation", Organometallics, vol. 7, No. 4, Apr. 1, 1988 (Apr. 1, 1988), pp. 936-945, XP093054742, ISSN: 0276-7333, DOI: 10.1021/om00094a025.
Feenan J. J. et al, "Chromium Catalysts for Oxidizing Automotive Exhaust", Journal of the Air Pollution Control Association, JAPCA, vol. 14, No. 4, Apr. 1, 1964 (Apr. 1, 1964), pp. 113-117, XP093054834, us ISSN: 0002-2470.
Baker, et al., Oxidation of olefins by supported chromium oxide, The Journal of Organic Chemistry, vol. 33, No. 2, pp. 616-618 (Year: 1968).
McDaniel, et al., "Long Chain Branching in Polyethylene from the Phillips Chromium Catalyst," Polymer Reaction Engineering vol. 11, No. 2, pp. 105-135, 2003.
Monwar, et.al., "Ethylene polymerization by hydrocarbon-reduced Cr/silica catalyst", Journal of Catalysis 394 (2021) 451-464. DOI 10.1016/j.jcat.2020.10.019.
Schwerdtfeger, E., et al., Reduction of Cr(VI) polymerization catalysts by non-olefinic hydrocarbons, Applied Catalysis A: General, 423-424, pp. 91-99 (Year: 2012).

* cited by examiner

Primary Examiner — Fred M Teskin

(74) Attorney, Agent, or Firm — Merchant & Gould P.C.

(57) ABSTRACT

A hydrocarbon compound and carbon monoxide are reacted in the presence of either a supported chromium (VI) catalyst or a supported chromium (II) catalyst, optionally with UV-visible light irradiation and/or exposure to an oxidizing atmosphere, followed by removing a reaction product containing an alcohol compound and/or a carbonyl compound from the respective chromium catalyst. Often, the reaction product contains one or more ketone and/or aldehyde compounds.

20 Claims, No Drawings

CHROMIUM-CATALYZED REACTIONS OF CARBON MONOXIDE WITH HYDROCARBONS IN THE PRESENCE OF UV LIGHT

REFERENCE TO RELATED APPLICATION

This application claims the benefit of U.S. Provisional Patent Application No. 63/327,834, filed on Apr. 6, 2022, the disclosure of which is incorporated herein by reference in its entirety.

FIELD OF THE INVENTION

The present disclosure generally relates to reacting a hydrocarbon compound and carbon monoxide to produce alcohols and/or carbonyls, and more particularly, relates to performing such reactions in the presence of a supported chromium catalyst.

BACKGROUND OF THE INVENTION

Alcohol and carbonyl compounds can be prepared by various synthesis techniques from alkanes, but such techniques often require halogens or harsh reaction conditions. Alternative reaction schemes are therefore desirable. Accordingly, it is to these ends that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Aspects of this invention are directed to processes for producing an alcohol compound and/or a carbonyl compound in the presence of a supported chromium (II) catalyst. In one aspect, the process can comprise (a) contacting a hydrocarbon reactant, carbon monoxide, and a supported chromium (II) catalyst to form a treated chromium catalyst, and (b) removing from the treated chromium catalyst a reaction product comprising an alcohol compound and/or a carbonyl compound (e.g., a ketone or aldehyde compound). In another aspect, the process can comprise (a) irradiating a hydrocarbon reactant, carbon monoxide, and a supported chromium catalyst (II) catalyst with a light beam at a wavelength in the UV-visible spectrum to form a treated chromium catalyst, and (b) removing from the treated chromium catalyst a reaction product comprising an alcohol compound and/or a carbonyl compound. In yet another aspect, the process can comprise (A) contacting a hydrocarbon reactant, carbon monoxide, and a supported chromium (II) catalyst to form a treated chromium catalyst, (B) subjecting the treated chromium catalyst to an oxidizing atmosphere, and (C) removing from the treated chromium catalyst a reaction product comprising an alcohol compound and/or a carbonyl compound. In still another aspect, the process can comprise (A) irradiating a hydrocarbon reactant, carbon monoxide, and a supported chromium catalyst (II) catalyst with a light beam at a wavelength in the UV-visible spectrum to form a treated chromium catalyst, (B) subjecting the treated chromium catalyst to an oxidizing atmosphere, and (C) removing from the treated chromium catalyst a reaction product comprising an alcohol compound and/or a carbonyl compound.

Other aspects of this invention are directed to processes for producing an alcohol compound and/or a carbonyl compound in the presence of a supported chromium (IV) catalyst. In one aspect, the process can comprise (i) irradiating a hydrocarbon reactant, carbon monoxide, and a supported chromium catalyst comprising chromium in a hexavalent oxidation state with a light beam at a wavelength in the UV-visible spectrum to reduce at least a portion of the supported chromium catalyst to form a reduced chromium catalyst, and (ii) removing from the reduced chromium catalyst a reaction product comprising an alcohol compound and/or a carbonyl compound (e.g., a ketone or aldehyde compound). In another aspect, the process can comprise (I) irradiating a hydrocarbon reactant, carbon monoxide, and a supported chromium catalyst comprising chromium in a hexavalent oxidation state with a light beam at a wavelength in the UV-visible spectrum to reduce at least a portion of the supported chromium catalyst to form a reduced chromium catalyst, (II) subjecting the reduced chromium catalyst to an oxidizing atmosphere, and (III) removing from the reduced chromium catalyst a reaction product comprising an alcohol compound and/or a carbonyl compound.

Also provided herein are compositions formed by the disclosed processes and which contain alcohol and/or carbonyl compounds, such as ketones and aldehydes. Further, processes for producing polyester polymers and for producing ethylene/carbon monoxide copolymers also are described herein.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the catalysts, compositions, processes, or methods described herein are contemplated with or without explicit description of the particular combination. Additionally, unless explicitly recited otherwise, any aspect or feature disclosed herein can be combined to describe inventive catalysts, compositions, processes, or methods consistent with the present disclosure.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "hydrocarbon" refers to a compound containing only carbon and hydrogen, whether saturated or unsaturated. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). Non-limiting examples of hydrocarbons include alkanes (linear, branched, and cyclic), alkenes (olefins), and aromatics, among other compounds. Herein, cyclics and aromatics encompass fused ring compounds such as bicyclics and polycyclics.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

Unless otherwise specified, the term "substituted" when used to describe a group, for example, when referring to a substituted analog of a particular group, is intended to describe any non-hydrogen moiety that formally replaces a hydrogen in that group, and is intended to be non-limiting. Also, unless otherwise specified, a group or groups can also be referred to herein as "unsubstituted" or by equivalent terms such as "non-substituted," which refers to the original group in which a non-hydrogen moiety does not replace a hydrogen within that group. Moreover, unless otherwise specified, "substituted" is intended to be non-limiting and include inorganic substituents or organic substituents as understood by one of ordinary skill in the art.

The terms "contacting" and "combining" are used herein to describe catalysts, compositions, processes, and methods in which the materials or components are contacted or combined together in any order, in any manner, and for any length of time, unless otherwise specified. For example, the materials or components can be blended, mixed, slurried, dissolved, reacted, treated, impregnated, compounded, or otherwise contacted or combined in some other manner or by any suitable method or technique.

"BET surface area" as used herein means the surface area as determined by the nitrogen adsorption Brunauer, Emmett, and Teller (BET) method according to ASTM D1993-91, and as described, for example, in Brunauer, S., Emmett, P. H., and Teller, E., "Adsorption of gases in multimolecular layers," J. Am. Chem. Soc., 60, 3, pp. 309-319.

In this disclosure, while catalysts, compositions, processes, and methods are described in terms of "comprising" various components or steps, the catalysts, compositions, processes, and methods also can "consist essentially of" or "consist of" the various components or steps, unless stated otherwise.

The terms "a," "an," and "the" are intended to include plural alternatives, e.g., at least one. For instance, the disclosure of "a hydrocarbon reactant," "a solid oxide," etc., is meant to encompass one, or mixtures or combinations of more than one, hydrocarbon reactant, solid oxide, etc., unless otherwise specified.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. For example, when a chemical compound having a certain number of carbon atoms is disclosed or claimed, the intent is to disclose or claim individually every possible number that such a range could encompass, consistent with the disclosure herein. For example, the disclosure that a hydrocarbon reactant contains a $C_1$ to $C_{18}$ alkane compound, or in alternative language, an alkane compound having from 1 to 18 carbon atoms, as used herein, refers to a compound that can have 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ alkane compound), and also including any combination of ranges between these two numbers (for example, a $C_2$ to $C_4$ alkane compound and a $C_{12}$ to $C_{16}$ alkane compound).

Similarly, another representative example follows for the amount of chromium on the supported chromium catalyst consistent with aspects of this invention. By a disclosure that the amount of chromium can be in a range from 0.1 to 15 wt. %, the intent is to recite that the amount of chromium can be any amount in the range and, for example, can include any range or combination of ranges from 0.1 to 15 wt. %, such as from 0.2 to 10 wt. %, from 0.1 to 5 wt. %, from 0.5 to 2.5 wt. %, or from 5 to 15 wt. %, and so forth. Likewise, all other ranges disclosed herein should be interpreted in a manner similar to these examples.

In general, an amount, size, formulation, parameter, range, or other quantity or characteristic is "about" or "approximate" whether or not expressly stated to be such. Whether or not modified by the term "about" or "approximately," the claims include equivalents to the quantities or characteristics.

Although any methods, devices, and materials similar or equivalent to those described herein can be used in the practice or testing of the invention, the typical methods, devices, and materials are herein described.

All publications and patents mentioned herein are incorporated herein by reference in their entirety for the purpose of describing and disclosing, for example, the constructs and methodologies that are described in the publications and patents, which might be used in connection with the presently described invention.

DETAILED DESCRIPTION OF THE INVENTION

The present invention is generally directed to the reaction of a hydrocarbon and carbon monoxide in the presence of a supported chromium catalyst to form higher carbon number alcohol compounds and/or carbonyl compounds. Optionally, the reaction process can include UV-visible light irradiation and/or exposure to an oxidizing atmosphere.

It was expected, due to the well-known ability of oxygen to stop polymerization on Cr-based catalysts, that performing any step in the disclosed processes in an oxidizing atmosphere would result in no formation of alcohol/carbonyl products. However, instead, significant increases in the molar yield of alcohol/carbonyl products (based on the chromium present in the catalyst) often resulted.

Processes for Producing Alcohols and/or Carbonyls

Disclosed herein are processes for producing an alcohol compound and/or a carbonyl compound in the presence of a supported chromium (II) catalyst. A first process can comprise (a) contacting a hydrocarbon reactant, carbon monoxide, and a supported chromium (II) catalyst to form a treated chromium catalyst, and (b) removing from the treated chromium catalyst a reaction product comprising an alcohol compound and/or a carbonyl compound (e.g., a ketone or aldehyde compound). A second process can comprise (a) irradiating a hydrocarbon reactant, carbon monoxide, and a supported chromium catalyst (II) catalyst with a light beam at a wavelength in the UV-visible spectrum to form a treated chromium catalyst, and (b) removing from the treated chromium catalyst a reaction product comprising an alcohol compound and/or a carbonyl compound (e.g., a ketone or aldehyde compound). A third process can comprise (A) contacting a hydrocarbon reactant, carbon monoxide, and a supported chromium (II) catalyst to form a treated chromium catalyst, (B) subjecting the treated chromium catalyst to an oxidizing atmosphere, and (C) removing from the treated chromium catalyst a reaction product comprising an alcohol compound and/or a carbonyl compound (e.g., a ketone or aldehyde compound). A fourth process can comprise (A) irradiating a hydrocarbon reactant, carbon monoxide, and a supported chromium catalyst (II) catalyst with a light beam at a wavelength in the UV-visible spectrum to form a treated chromium catalyst, (B) subjecting the treated chromium catalyst to an oxidizing atmosphere, and (C) removing from the treated chromium catalyst a reaction product comprising an alcohol compound and/or a carbonyl compound (e.g., a ketone or aldehyde compound). Thus, processes that comprise a supported chromium (II) catalyst can utilize UV-visible light irradiation, or an oxidizing atmosphere, or both UV-visible light irradiation and an oxidizing atmosphere, or neither UV-visible light irradiation or an oxidizing atmosphere.

Also disclosed herein are processes for producing an alcohol compound and/or a carbonyl compound in the presence of a supported chromium (VI) catalyst. A fifth process can comprise (i) irradiating a hydrocarbon reactant, carbon monoxide, and a supported chromium catalyst comprising chromium in a hexavalent oxidation state with a light beam at a wavelength in the UV-visible spectrum to reduce at least a portion of the supported chromium catalyst to form a reduced chromium catalyst, and (ii) removing from the reduced chromium catalyst a reaction product comprising an alcohol compound and/or a carbonyl compound (e.g., a ketone or aldehyde compound). The reduced chromium catalyst can have an average oxidation state less than that of the parent supported chromium catalyst. A sixth process can comprise (I) irradiating a hydrocarbon reactant, carbon monoxide, and a supported chromium catalyst comprising chromium in a hexavalent oxidation state with a light beam at a wavelength in the UV-visible spectrum to reduce at least a portion of the supported chromium catalyst to form a reduced chromium catalyst, (II) subjecting the reduced chromium catalyst to an oxidizing atmosphere, and (III) removing from the reduced chromium catalyst a reaction product comprising an alcohol compound and/or a carbonyl compound (e.g., a ketone or aldehyde compound). Thus, processes that comprise a supported chromium (VI) catalyst utilize UV-visible light irradiation, and can utilize an oxidizing atmosphere or not.

Generally, the features of the first process, the second process, the third process, the fourth process, the fifth process, and the sixth process (e.g., the hydrocarbon reactant, the supported chromium catalyst, the reduced chromium catalyst, the supported chromium (II) catalyst, the treated chromium catalyst, the light beam, the oxidizing atmosphere, and the conditions under which the irradiating step and the removing step are conducted, among others) are independently described herein and these features can be combined in any combination to further describe the disclosed processes to produce alcohol compounds and/or carbonyl compounds. Moreover, additional process steps can be performed before, during, and/or after any of the steps in any of the processes disclosed herein, and can be utilized without limitation and in any combination to further describe these processes, unless stated otherwise. Further, any alcohol compounds and/or carbonyl compounds (e.g., compositions containing one or more such alcohol and/or carbonyl compounds; any reaction products containing the alcohol compound and/or the carbonyl compound—such as a ketone compound and/or an aldehyde compound) produced in accordance with the disclosed processes are within the scope of this disclosure and are encompassed herein.

A variety of hydrocarbon reactants can be used in the process to form an alcohol compound and/or a carbonyl compound, inclusive of saturated aliphatic hydrocarbon compounds, unsaturated aliphatic hydrocarbon compounds, linear aliphatic hydrocarbon compounds, branched aliphatic hydrocarbon compounds, and cyclic aliphatic hydrocarbon compounds, as well as combinations thereof. Thus, the hydrocarbon reactant can comprise a linear alkane compound, a branched alkane compound, a cyclic alkane compound, or a combination thereof. Additionally or alternatively, the hydrocarbon reactant can comprise an aromatic compound, such as benzene, toluene, xylene, styrene, and the like, as well as substituted versions thereof, and including combinations thereof. Additionally or alternatively, the hydrocarbon reactant can comprise a linear olefin compound (e.g., an α-olefin), a branched olefin compound, a cyclic olefin compound, or a combination thereof.

Any suitable carbon number hydrocarbon can be used, such that the hydrocarbon reactant can comprise a $C_n$ hydrocarbon compound (and the alcohol compound often can comprise a $C_{n+1}$ alcohol compound, and the carbonyl compound often can comprise a $C_{n+1}$ carbonyl compound). While not being limited thereto, the integer n can range from 1 to 36 in one aspect, from 1 to 18 in another aspect, from 1 to 12 in yet another aspect, and from 1 to 8 in still another aspect. In one aspect, the hydrocarbon reactant can comprise ethylene, and the carbonyl compound can comprise cyclopentanone. In another aspect, the hydrocarbon reactant can comprise propane or propylene, and the carbonyl compound can comprise butanal. In yet another aspect, the hydrocarbon reactant can comprise butane or 1-butene, and the carbonyl compound can comprise pentanal.

Therefore, the hydrocarbon reactant can comprise any suitable carbon number alkane compound, for instance, a $C_1$ to $C_{36}$ alkane compound; alternatively, a $C_1$ to $C_{18}$ alkane compound; alternatively, a $C_1$ to $C_{12}$ alkane compound; or alternatively, a $C_1$ to $C_8$ alkane compound. If desired, the hydrocarbon reactant can contain a single alkane compound of relatively high purity, such as at least 90 wt. % of a single alkane compound, at least 95 wt. % of a single alkane compound, at least 98 wt. % of a single alkane compound, or at least 99 wt. % of a single alkane compound, and so forth. Alternatively, the hydrocarbon reactant can comprise a mixture of two or more hydrocarbon reactants, such as two or more alkane compounds in any relative proportions. Thus, the hydrocarbon reactant can comprise a mixture of $C_1$ to $C_{18}$ alkane compounds, a mixture of $C_1$ to $C_4$ alkane compounds, a mixture of $C_2$ to $C_6$ alkane compounds, a mixture of $C_6$ to $C_8$ alkane compounds, or a mixture of $C_{10}$ to $C_{14}$ alkane compounds, and the like.

Similarly, the hydrocarbon reactant can comprise any suitable carbon number olefin compound, for instance, a $C_2$ to $C_{36}$ olefin compound; alternatively, a $C_2$ to $C_{18}$ olefin compound; alternatively, a $C_2$ to $C_{12}$ olefin compound; or alternatively, a $C_2$ to $C_8$ olefin compound. As above, if desired, the hydrocarbon reactant can contain a single olefin compound of relatively high purity, such as at least 90 wt. % of a single olefin compound, at least 95 wt. % of a single olefin compound, at least 98 wt. % of a single olefin compound, or at least 99 wt. % of a single olefin compound, and so forth. Alternatively, the hydrocarbon reactant can comprise a mixture of two or more hydrocarbon reactants, such as two or more olefin compounds in any relative proportions. Thus, the hydrocarbon reactant can comprise a mixture of $C_2$ to $C_{36}$ olefin compounds, a mixture of $C_2$ to $C_{18}$ olefin compounds, a mixture of $C_2$ to $C_{12}$ olefin compounds, or a mixture of $C_2$ to $C_8$ olefin compounds, and the like.

Likewise, the hydrocarbon reactant can comprise any suitable carbon number aromatic compound, for instance, a $C_6$ to $C_{36}$ aromatic compound; alternatively, a $C_6$ to $C_{18}$ aromatic compound; alternatively, a $C_6$ to $C_{12}$ aromatic compound; or alternatively, a $C_6$ to $C_8$ aromatic compound. As above, if desired, the hydrocarbon reactant can contain a single aromatic compound of relatively high purity, such as at least 90 wt. % of a single aromatic compound, at least 95 wt. % of a single aromatic compound, at least 98 wt. % of a single aromatic compound, or at least 99 wt. % of a single aromatic compound, and so forth. Alternatively, the hydrocarbon reactant can comprise a mixture of two or more hydrocarbon reactants, such as two or more aromatic compounds in any relative proportions. Thus, the hydrocarbon reactant can comprise a mixture of $C_6$ to $C_{36}$ aromatic compounds, a mixture of $C_6$ to $C_{18}$ aromatic compounds, a mixture of $C_6$ to $C_{12}$ aromatic compounds, or a mixture of $C_6$ to $C_8$ aromatic compounds, and the like.

Illustrative examples of alkane, olefin, and aromatic hydrocarbon reactants can include methane, ethane, propane, butane (e.g., n-butane or isobutane), pentane (e.g., n-pentane, neopentane, cyclopentane, or isopentane), hexane, heptane, octane, nonane, decane, undecane, dodecane, tridecane, tetradecane, pentadecane, hexadecane, heptadecane, octadecane, ethylene, propylene, 1-butene, 1-pentene, 2-pentene, 1-hexene, 1-heptene, 1-octene, 1-decene, 1-dodecene, 1-tetradecene, 1-hexadecene, 1-octadecene, cyclopentene, cyclohexene, benzene, toluene, ethylbenzene, xylene, styrene, mesitylene, and the like, as well as combinations thereof.

Thus, the hydrocarbon reactant can comprise a mixture of an aliphatic hydrocarbon and an aromatic hydrocarbon. In a non-limiting aspect, the hydrocarbon reactant can comprise methane; alternatively, ethane; alternatively, propane; alternatively, butane; alternatively, pentane; alternatively, hexane; alternatively, heptane; alternatively, octane; alternatively, nonane; alternatively, decane; alternatively, undecane; alternatively, dodecane; alternatively, tridecane; alternatively, tetradecane; alternatively, pentadecane; alternatively, hexadecane; alternatively, heptadecane; alternatively, octadecane; alternatively, ethylene; alternatively, propylene; alternatively, 1-butene; alternatively, 1-pentene; alternatively, 1-hexene; alternatively, 1-heptene; alternatively, 1-octene; alternatively, 1-decene; alternatively, 1-dodecene; alternatively, 1-tetradecene; alternatively, 1-hexadecene; alternatively, 1-octadecene; alternatively, cyclopentene; alternatively, cyclohexene; alternatively, benzene; alternatively, toluene; alternatively, ethylbenzene; alternatively, xylene; alternatively, styrene; or alternatively, mesitylene.

In an aspect, the hydrocarbon (alkane) reactant can comprise methane, ethane, propane, n-butane, isobutane, n-pentane, neopentane, isopentane, n-hexane, n-heptane, n-octane, n-decane, n-dodecane, and the like, or any combination thereof, while in another aspect, the hydrocarbon (alkane) reactant can comprise methane, ethane, propane, butane, pentane, hexane, and the like, or any combination thereof. In yet another aspect, the hydrocarbon (olefin) reactant can comprise ethylene, propylene, 1-butene, 1-pentene, 2-pentene, 1-hexene, 1-heptene, 1-octene, 1-decene, 1-dodecene, 1-tetradecene, 1-hexadecene, 1-octadecene, cyclopentene, cyclohexene, and the like, or any combination thereof, or alternatively, ethylene, propylene, 1-butene, 1-pentene, 1-hexene, 1-heptene, 1-octene, or any combination thereof. In still another aspect, the hydrocarbon (aromatic) reactant can comprise benzene, toluene, ethylbenzene, xylene, mesitylene, styrene, 4-phenyl-1-butene, and the like, or any combination thereof.

Generally, in the first process, the second process, the third process, the fourth process, the fifth process, and the sixth process, the irradiating step or the contacting step can be performed under any conditions sufficient to accommodate the irradiation of or contacting of the hydrocarbon reactant, carbon monoxide, and the supported chromium catalyst (comprising chromium in a hexavalent oxidation state) to form the reduced chromium catalyst (having a lower oxidation state), or the irradiation of or contacting of the hydrocarbon reactant, carbon monoxide, and the supported chromium (II) catalyst to form the treated catalyst. For instance, the relative amount (or concentration) of the hydrocarbon reactant to the amount of chromium (in the supported chromium catalyst or the supported chromium (II) catalyst) can alter the efficacy of the reduction process. In certain aspects, the molar ratio of the hydrocarbon reactant to the chromium (in the supported chromium catalyst or the supported chromium (II) catalyst) can be at least 0.25:1, at least 0.5:1, at least 1:1, at least 10:1, at least 100:1, at least 1000:1, or at least 10,000:1. Thus, a large excess of the hydrocarbon reactant can be used, and there is no particular limit as to the maximum amount of hydrocarbon reactant.

Likewise, the molar ratio of elemental oxygen or other oxidizing agent to chromium (of the reduced chromium catalyst or of the treated chromium catalyst, as the context requires for the respective process) is not particularly limited, but often can be at least 0.25:1, at least 0.5:1, at least 1:1, at least 10:1, at least 100:1, at least 1000:1, or at least 10,000:1. Thus, a large excess of the elemental oxygen or other oxidizing agent can be used, and there is no particular limit as to the maximum amount of elemental oxygen or other oxidizing agent in the oxidizing atmosphere. For instance, a large molar excess of air can be used in these processes.

While not being limited thereto, in the first process, the second process, the third process, the fourth process, the fifth process, and the sixth process, the molar ratio of the hydrocarbon reactant to carbon monoxide often falls within a range from 0.01:1 to 250:1. In one aspect, for instance, the molar ratio of the hydrocarbon reactant to carbon monoxide can range from 0.1:1 to 50:1, while in another aspect, the molar ratio can range from 0.1:1 to 10:1, and in yet another aspect, the molar ratio can range from 0.2:1 to 8:1, and in still another aspect, the molar ratio can range from 0.5:1 to 5:1.

In the first process, the second process, the third process, the fourth process, the fifth process, and the sixth process, the temperature and pressure of the irradiating step (or contacting step) can be such that the hydrocarbon reactant remains a liquid throughout the irradiating step (or contacting step) in one aspect, and the hydrocarbon reactant remains a gas throughout irradiating step (or contacting step) in another aspect. For instance, the irradiating step (or the contacting step) can be conducted at a temperature of less than 200° C., less than 100° C., less than 70° C., less than 40° C., from 0° C. to 200° C., from −100° C. to 100° C., from 0° C. to 100° C., or from 10° C. to 40° C. These temperature ranges also are meant to encompass circumstances where the irradiation or the contacting is performed at a series of different temperatures, instead of at a single fixed temperature, falling within the respective temperature ranges, wherein at least one temperature is within the recited ranges.

The irradiating step can be further characterized by an amount of time that the hydrocarbon reactant, carbon monoxide, and the respective chromium catalyst are exposed to the light beam, e.g., an exposure time. Likewise, the contacting step can be further characterized by the amount of time that the hydrocarbon reactant, carbon monoxide, and the respective catalyst are contacted, e.g., a contact time. Thus, in certain aspects, and not being limited thereto, the exposure time (or the contact time) can be in a range from 15 sec to 48 hr, from 15 sec to 24 hr, from 1 hr to 8 hr, from 15 min to 4 hr, from 1 min to 6 hr, from 5 min to 1 hr, from 10 min to 2 hr, from 1 min to 1 hr, or from 1 min to 15 min. As one of skill in the art would recognize, the exposure time can vary based on the intensity of the light beam, the wavelength(s) of the light beam, and so forth. Agitation, mixing, or other suitable technique can be used to ensure that the mixture of the chromium catalyst (e.g., solid particles) and carbon monoxide and the hydrocarbon reactant is uniformly contacted and/or exposed to the light beam irradiation.

The respective chromium catalyst, carbon monoxide, and the hydrocarbon reactant can be continuously subjected to irradiation (for the entirety of the exposure time), or the irradiation can be pulsed (such that the total of the pulses equates to the exposure time, e.g., sixty 1-sec pulses equates to a 60-sec exposure time). Combinations of periods of continuous irradiation and pulsed irradiation can be utilized, if desired.

For the irradiation step in any of the disclosed processes, a wide range of wavelengths, light sources, and intensities can be used, as long as these wavelengths, light sources, and intensities are sufficient to form desirable alcohol and/or carbonyl products. In certain aspects, for instance, the light can be derived from any suitable source, such as from sunlight, a fluorescent white light, an LED diode, and/or a UV lamp. The distance from non-sunlight sources can be varied as needed (e.g., minimized) to increase the effectiveness of the irradiation.

The wavelength of the light can be any in the range of UV-visible light. In certain aspects, the wavelength of the light beam can be a single wavelength, or more than one wavelength, such as a range of wavelengths. For instance, the wavelength of the light beam can be a range of wavelengths spanning at least 25 nm, at least 50 nm, at least 100 nm, at least 200 nm, or at least 300 nm. In one aspect, the wavelength of the light beam can comprise a single wavelength or a range of wavelengths in the UV spectrum, in the visible spectrum (from 380 nm to 780 nm), or both. In another aspect, the wavelength of the light beam can comprise a single wavelength or a range of wavelengths in the 200 nm to 750 nm range. Yet, in another aspect, the wavelength of the light beam can comprise a single wavelength or a range of wavelengths in the 300 to 750 nm range, the 350 nm to 650 nm range, the 300 nm to 600 nm range, the 300 nm to 500 nm range, the 400 nm to 500 nm range, or the 300 nm to 400 nm range. In other aspects, the wavelength of the light beam can comprise a single wavelength or a range of wavelengths below 600 nm, below 525 nm, or below 500 nm; additionally or alternatively, above 300 nm, above 350 nm, above 400 nm, or above 450 nm. Beneficially, blue light and UV light sources are typically more effective, thus the wavelength of the light beam can comprise a single wavelength or a range of wavelengths below 475 nm; alternatively, below 450 nm; alternatively, below 430 nm; or alternatively, below 420 nm; and additionally or alternatively, above 350 nm; alternatively, above 370 nm; alternatively, above 380 nm; or alternatively, above 400 nm.

The light beam of the irradiating step also can be characterized by its intensity (e.g., the total amount of light emitted from a source). In certain aspects, the light beam can have an intensity of at least 500 lumens, at least 1,000 lumens, at least 2,000 lumens at least 5,000 lumens, at least 10,000 lumens, at least 20,000 lumens, at least 50,000 lumens, or at least 100,000 lumens. Thus, there may not be an upper limit on the intensity of the light source. Alternatively, the light beam can have an intensity in a range from 50 to 50,000 lumens, from 50 to 10,000 lumens, from 100 to 5,000 lumens, or from 500 to 2,000 lumens. Additionally, the light beam can be characterized by the amount of light reaching the hydrocarbon reactant, carbon monoxide, and the respective chromium catalyst, i.e., the flux. In certain aspects, the hydrocarbon reactant, carbon monoxide, and the respective chromium catalyst can be irradiated by at least 1000 lux, at least 2000 lux, at least 5000 lux, at least 10,000 lux, at least 20,000 lux, at least 50,000 lux, at least 100,000 lux. The amount of lux can be less than or equal to 250,000 lux, less than or equal to 200,000 lux, less than or equal to 150,000 lux, or less than or equal to 125,000 lux. Additionally, the hydrocarbon reactant, carbon monoxide, and the respective chromium catalyst can be irradiated with a lux value between any minimum lux and any maximum lux disclosed herein, e.g., from 10,000 to 250,000 lux, from 10,000 to 100,000 lux, from 20,000 to 200,000 lux, from 20,000 to 100,000 lux, from 50,000 to 250,000 lux, or from 50,000 to 200,000 lux, and the like.

Additionally or alternatively, in certain aspects, the hydrocarbon reactant, carbon monoxide, and the respective chromium catalyst can be irradiated with a light beam from a light source having a power of at least 50 watts, at least 100 watts, at least 200 watts, at least 500 watts, at least 1,000 watts, or at least 2,000 watts.

Any suitable reactor or vessel can be used for the first process, the second process, the third process, the fourth process, the fifth process, and the sixth process (or for any one or more steps in the first process, the second process, the third process, the fourth process, the fifth process, and the sixth process), non-limiting examples of which can include a flow reactor, a continuous reactor, a packed bed reactor, a fluidized bed reactor, and a stirred tank reactor, including more than one reactor in series or in parallel, and including any combination of reactor types and arrangements.

In one aspect, the hydrocarbon reactant can be in a gas phase during the irradiating step (or contacting step). In another aspect, the hydrocarbon reactant can be in a liquid phase during the irradiating step (or contacting step). In another aspect, the disclosed processes can comprise irradiating (or contacting) carbon monoxide and a slurry (e.g., a loop slurry) of the solid supported chromium catalyst in the hydrocarbon reactant. In yet another aspect, the disclosed processes can comprise contacting the hydrocarbon reactant and carbon monoxide with a fluidized bed of the solid chromium catalyst, and irradiating while contacting (fluidizing), if applicable. In still another aspect, the disclosed processes can comprise contacting the hydrocarbon reactant (e.g., in the gas phase or in the liquid phase) and carbon monoxide with a fixed bed of the solid chromium catalyst, and irradiating while contacting, if applicable. As a skilled artisan would recognize, there are other methods for contacting the hydrocarbon reactant, carbon monoxide, and the solid chromium catalysts and irradiating (if applicable), and the disclosed processes are not limited solely to those disclosed herein. For instance, the hydrocarbon reactant, carbon monoxide, and the solid chromium catalyst can be mixed or contacted in a stirred tank, and irradiated while being mixed in the stirred tank, if applicable.

Any suitable pressure can be used to contact the hydrocarbon reactant, carbon monoxide, and the respective catalyst, and such can depend upon the carbon number of the hydrocarbon reactant (and its boiling point), the type of reactor configuration and desired mode for contacting the hydrocarbon reactant and carbon monoxide with the (solid) chromium catalyst, among other considerations.

Often, the irradiating step (or contacting step) in the disclosed processes can be a flow process and/or a continuous process. In such circumstances, the hydrocarbon reactant-chromium catalyst contact time (or reaction time) can be expressed in terms of weight hourly space velocity (WHSV)—the ratio of the weight of the hydrocarbon reactant which comes in contact with a given weight of the respective chromium catalyst per unit time (units of g/g/hr, or $hr^{-1}$).

While not limited thereto, the WHSV employed for the disclosed processes can have a minimum value of 0.01 $hr^{-1}$, 0.02 $hr^{-1}$, 0.05 $hr^{-1}$, 0.1 $hr^{-1}$, 0.25 $hr^{-1}$, or 0.5 $hr^{-1}$; or alternatively, a maximum value of 500 $hr^{-1}$, 400 $hr^{-1}$, 300 $hr^{-1}$, 100 $hr^{-1}$, 50 $hr^{-1}$, 10 $hr^{-1}$, 5 $hr^{-1}$, 2 $hr^{-1}$, or 1 $hr^{-1}$. Generally, the WHSV can be in a range from any minimum WHSV disclosed herein to any maximum WHSV disclosed herein. In a non-limiting aspect, the WHSV can be in a range from 0.01 $hr^{-1}$ to 500 $hr^{-1}$; alternatively, from 0.01 $hr^{-1}$ to 10 $hr^{-1}$; alternatively, from 0.01 $hr^{-1}$ to 1 $hr^{-1}$; alternatively, from 0.02 $hr^{-1}$ to 400 $hr^{-1}$; alternatively, from 0.02 $hr^{-1}$ to 50 $hr^{-1}$; alternatively, from 0.05 $hr^{-1}$ to 300 $hr^{-1}$; alternatively, from 0.05 $hr^{-1}$ to 5 $hr^{-1}$; alternatively, from 0.1 $hr^{-1}$ to 10 $hr^{-1}$; alternatively, from 0.25 $hr^{-1}$ to 50 $hr^{-1}$; alternatively, from 0.25 $hr^{-1}$ to 2 $hr^{-1}$; alternatively, from 0.5 $hr^{-1}$ to 400 $hr^{-1}$; alternatively, from 0.5 $h^{-1}$ to 5 $hr^{-1}$; or alternatively, from 0.5 $hr^{-1}$ to 2 $hr^{-1}$. Other WHSV ranges are readily apparent from this disclosure.

Referring now to the third process, the fourth process, and the sixth process, step (B) or step (II) is directed to subjecting the treated chromium catalyst or the reduced chromium catalyst to an oxidizing atmosphere. This step of subjecting the respective chromium catalyst to an oxidizing atmosphere generally can be performed, independently, under the same temperature, pressure, time, and method of contacting (e.g., fixed bed or fluidized bed) conditions described herein for the contacting and irradiating steps.

The oxidizing atmosphere in the third process, the fourth process, and the sixth process is not particular limited. Typical materials used to create the oxidizing atmosphere include, but are not limited to, oxygen, air, a mixture of air and an inert gas (such as nitrogen), a mixture of oxygen and an inert gas, NO, $NO_2$, $N_2O$, ozone, a halide oxide, $H_2O_2$, an organic peroxide, and the like, as well as combinations thereof. For convenience, air is often used, and thus the respective chromium catalyst in the third process, the fourth process, and the sixth process can be simply subjected to or exposed to air under any suitable conditions.

Referring now to the removing steps in the first process, the second process, the third process, the fourth process, the fifth process, and the sixth process, a reaction product comprising an alcohol compound and/or a carbonyl compound (e.g., a ketone or aldehyde compound) is removed from the treated chromium catalyst or the reduced chromium catalyst. While not wishing to be bound by theory, it is believed that the reaction product is bound to the chromium, bound/absorbed onto the support, or a combination thereof. Thus, there are many suitable techniques that can be used to remove the reaction product from the respective catalyst and its support.

In one aspect, the removing step can be accomplished by subjecting the reduced chromium catalyst (or the treated chromium catalyst) to hydrogen ($H_2$) to form the reaction product comprising the alcohol compound and/or the carbonyl compound. In another aspect, the removing step can be accomplished by subjecting the reduced chromium catalyst (or the treated chromium catalyst) to an inert atmosphere—such as nitrogen—and an elevated temperature to form the reaction product comprising the alcohol compound and/or the carbonyl compound. In another aspect, the removing step can be accomplished by subjecting the reduced chromium catalyst (or the treated chromium catalyst) to a pressure swing desorption process to form the reaction product comprising the alcohol compound and/or the carbonyl compound. In yet another aspect, the removing step can be accomplished by subjecting the reduced chromium catalyst (or the treated chromium catalyst) to a temperature swing desorption process to form the reaction product comprising the alcohol compound and/or the carbonyl compound. In still another aspect, the removing step can be accomplished by subjecting the reduced chromium catalyst (or the treated chromium catalyst) to an air desorption process to form the reaction product comprising the alcohol compound and/or the carbonyl compound. Combinations of two or more of these techniques can be utilized, if desired.

Another option for the step of removing from the respective chromium catalyst a reaction product comprising an alcohol compound and/or a carbonyl compound is hydrolysis. Thus, the removing step can comprise hydrolyzing the reduced chromium catalyst (or the treated chromium catalyst) to form the reaction product comprising the alcohol compound and/or the carbonyl compound. Generally, the temperature, pressure, and time features, independently, of the hydrolyzing step can be the same as those disclosed herein for the irradiating step (or contacting step), although not limited thereto. For example, the hydrolyzing step can be conducted at a temperature of less than 200° C., less than 100° C., less than 70° C., less than 40° C., from 0° C. to 200° C., from 0° C. to 100° C., or from 10° C. to 40° C., and can result in the formation of a reaction product containing the alcohol compound and/or the carbonyl compound. These temperature ranges also are meant to encompass circumstances where the hydrolyzing step is performed at a series of different temperatures, instead of at a single fixed temperature, falling within the respective temperature ranges, wherein at least one temperature is within the recited ranges.

While not limited thereto, the hydrolyzing step can comprise contacting the reduced chromium catalyst (or the treated chromium catalyst) with a hydrolysis agent. Illustrative and non-limiting examples of suitable hydrolysis agents can include water, steam, an alcohol agent, an acid agent, an alkaline agent, and the like, as well as combinations thereof. Thus, mixtures of water and various alcohol agents, such as $C_1$-$C_4$ alcohols (and/or acid agents, such as hydrochloric acid, sulfuric acid, acetic acid, ascorbic acid, and the like; and/or alkaline agents, such as sodium hydroxide, ammonium hydroxide, and the like) in any relative proportions can be used as the hydrolysis agent. Thus, the pH of the hydrolysis agent(s) can range from acid to neutral to basic pH values, generally encompassing a pH range from 1 (or less) to 13.

Optionally, the hydrolysis agent can further comprise any suitable reducing agent, and representative reducing agents include ascorbic acid, iron (II) reducing agents, zinc reducing agents, and the like, as well as combinations thereof. Often, the reducing agent can comprise sodium bisulfite, sodium thiosulfate, sodium sulfide, ascorbic acid, ferrous (II) ions, and the like, or any combination thereof. These are sometimes useful for preventing unwanted secondary oxidations by unreacted chromium (VI) or other chromium species. Further, they also can be used to tailor the product range by increasing selectivity. For example, in some aspects, adding reducing agents to the hydrolysis agent can eliminate all carbonyl products and instead produce only alcohol products.

As disclosed herein, the reaction product can comprise an alcohol compound and/or a carbonyl compound, which can be a higher carbon number analog of the hydrocarbon reactant. Thus, typical alcohol compounds that can be synthesized using the processes disclosed herein can include, for instance, methanol, ethanol, isopropanol, butanols, pentanols, hexanols, heptanols, octanols, nonanols, decanols, undecanols, dodecanols, tridecanols, tetradecanols, pentadecanols, hexadecanols, heptadecanols, octadecanols, benzyl alcohol, phenols, xylenols, and the like, as well as combinations thereof. Herein, an alcohol compound encompasses mono-alcohol compounds as well as diol compounds (e.g., ethanediol and hexanediols). Thus, the alcohol compound can comprise a diol, an allylic alcohol, a phenol, and the like, as well as any combination thereof.

In addition to or in lieu of the alcohol compound, the reaction product can comprise a carbonyl compound, such as an aldehyde compound, a ketone compound, or an organic acid compound, as well as any combination of aldehyde, ketone, and organic acid compounds. Thus, enols are encompassed herein, since the reaction product can comprise an alcohol compound, a carbonyl compound, or both. In some aspects, the alcohol or carbonyl product can contain unsaturation. For example, the carbon(s) adjacent to the alcohol or carbonyl group can contain a double bond. While not wishing to be bound by theory, it is believed that the allyl C—H bond is particularly susceptible to being attacked by the chromium (VI) or other chromium species. Thus, when the reductant hydrocarbon has a double bond, a typical alcohol product, and often among the most abundant, contains the —OH group on the adjacent allyl carbon. The alcohol compound in some aspects, therefore, can be an allylic alcohol such as a $C_4$-$C_8$ allylic alcohol. Non-limiting examples of allylic alcohols that can be prepared herein include 1-hexen-3-ol, 2-hexen-1-ol, 1-penten-3-ol, 2-penten-1-ol, 1-cyclohexen-3-ol, and the like, as well as combinations thereof.

In one aspect, the carbonyl compound can comprise a ketone, such as cyclopentanone. In another aspect, the carbonyl compound can comprise an aldehyde, such as ethanal, propanal, butanal, and/or pentanal; alternatively, propanal; alternatively, butanal; or alternatively, pentanal. In yet another aspect, the carbonyl compound can comprise a dicarbonyl compound, an illustrative example of which is a diketone. While not wishing to be bound by theory, it is believed that high carbon monoxide incorporation tends to favor multi-carbonyl compounds as compared to single carbonyl compounds, and a higher amount of carbon monoxide (versus hydrocarbon reactant) may lead to an increase in the carbonyl to alcohol ratio in the reaction product.

The processes described herein result in an unexpectedly high conversion of the hydrocarbon reactant and/or yield to the alcohol compound (or carbonyl compound). In one aspect, the minimum conversion (or yield) can be at least 2 wt. %, at least 5 wt. %, at least 10 wt. %, at least 15 wt. %, or at least 25 wt. % of the feedstock hydrocarbon. Additionally, the maximum conversion (or yield) can be 50 wt. %, 70 wt. %, 80 wt. %, 90 wt. %, 95 wt. %, or 99 wt. %, and can approach 100% conversion of the hydrocarbon reactant (or yield of the alcohol compound, or yield of the carbonyl compound). Generally, the conversion (or yield) can be in a range from any minimum conversion (or yield) disclosed herein to any maximum conversion (or yield) disclosed herein. Non-limiting ranges of conversion (or yield) can include from 5 wt. % to 99 wt. %, from 10 wt. % to 95 wt. %, or from 15 wt. % to 70 wt. %. For conversion, the percentages are the amount of the hydrocarbon reactant converted based on the initial amount of the hydrocarbon reactant. The yield values are weight percentages, and are based on the weight of the alcohol compound (or carbonyl compound) produced to the weight of hydrocarbon reactant. In some aspects, these conversions (or yields) can be achieved in a batch process, while in other aspects, these conversions (or yields) can be achieved in a flow or continuous process, such as, for example, a single pass or multiple passes through a reactor (e.g., a fixed bed reactor). Often, the conversion and yield can be manipulated by varying the ratio of reductant hydrocarbon feed to the amount of chromium (VI) or chromium (II), the amount of carbon monoxide, the amount of oxygen in the oxidizing atmosphere (if applicable), and by varying other reaction conditions such as time, temperature, and irradiation.

Also unexpectedly, continuous flow processes for producing the alcohol compound and/or carbonyl compound in accordance with this invention have unexpectedly high single pass conversions of the hydrocarbon reactant (or single pass yields to the desired alcohol or carbonyl compound). In one aspect, the minimum single pass conversion (or yield) can be at least 2 wt. %, at least 5 wt. %, at least 10 wt. %, at least 15 wt. %, or at least 25 wt. %. Additionally, the maximum single pass conversion (or yield) can be 50 wt. %, 70 wt. %, 80 wt. %, 90 wt. %, 95 wt. %, or 99 wt. %, and can approach 100% conversion of the hydrocarbon reactant (or yield of the alcohol compound, or yield of the carbonyl compound), depending upon the reaction conditions. Generally, the single pass conversion (or yield) can be in a range from any minimum single pass conversion (or yield) disclosed herein to any maximum single pass conversion (or yield) disclosed herein. Non-limiting ranges of single pass conversion (or yield) can include from 5 wt. % to 99 wt. %, from 10 wt. % to 95 wt. %, or from 15 wt. % to 70 wt. %.

In the fifth and sixth processes, the yield of the alcohol compound (or carbonyl compound) also can be characterized based on the amount of chromium (VI) (of the supported chromium catalyst). For instance, the molar ratio (molar yield) of the alcohol compound (or carbonyl compound) based on the moles of chromium (VI) can be at least 0.01 moles, at least 0.025 moles, at least 0.05 moles, at least 0.1 moles, at least 0.25 moles, at least 0.5 moles, or at least 0.75 moles. While not limited thereto, the yield in moles of product per mole of Cr(VI) often can be up to 100 moles, up to 10 moles, up to 8 moles, up to 5 moles, up to 3 moles, up to 2 moles, up to 1.5 moles, or up to 1 mole of the alcohol compound (or carbonyl compound) per mole of chromium (VI). If more than one alcohol compound and/or carbonyl compound is/are produced, then this ratio represents the total moles of alcohol and/or carbonyl compounds produced per mole of chromium (VI).

Similarly, in the first, second, third, and fourth process, the yield of the alcohol compound (or carbonyl compound) also can be characterized based on the amount of chromium (II) (of the supported chromium (II) catalyst). For instance, the molar ratio (molar yield) of the alcohol compound (or carbonyl compound) based on the moles of chromium (II) can be at least 0.01 moles, at least 0.025 moles, at least 0.05 moles, at least 0.1 moles, at least 0.25 moles, at least 0.5 moles, or at least 0.75 moles. While not limited thereto, the yield in moles of product per mole of Cr(II) often can be up to 100 moles, up to 10 moles, up to 8 moles, up to 5 moles, up to 3 moles, up to 2 moles, up to 1.5 moles, or up to 1 mole of the alcohol compound (or carbonyl compound) per mole of chromium (II). As above, if more than one alcohol compound and/or carbonyl compound is/are produced, then this ratio represents the total moles of alcohol and/or carbonyl compounds produced per mole of chromium (II).

The processes to produce the alcohol compounds and/or carbonyl compounds disclosed herein typically can result in—after the removing step—a crude reaction mixture containing residual carbon monoxide, residual hydrocarbon reactant, a desired alcohol compound and/or carbonyl compound, solvent (if used), and by-products. In many instances, it can be desirable to isolate or separate at least a portion (and in some cases, all) of the hydrocarbon reactant from the reaction product after the removing step. This can be accomplished using any suitable technique, which can include but is not limited to, extraction, filtration, evaporation, or distillation, as well as combinations of two or more of these techniques. In particular aspects of this invention, the isolating or separating step utilizes distillation at any suitable pressure (one or more than one distillation column can be used).

Additionally or alternatively, the processes disclosed herein can further comprise a step of separating at least a portion (and in some cases, all) of the alcohol compound (or carbonyl compound) from the reaction product, and any suitable technique can be used, such as extraction, filtration, evaporation, distillation, or any combination thereof. Additionally or alternatively, the processes disclosed herein can further comprise a step of separating at least a portion (and in some cases, all) of the reduced chromium catalyst (or the treated chromium catalyst) from the reaction product after the removing step, and as above, any suitable technique(s) can be used.

Optionally, certain components of the reaction product—such as the hydrocarbon reactant—can be recovered and recycled to the reactor. In such instances, at least a portion (and in some cases, all) of the hydrocarbon reactant can be recycled and contacted (and, if applicable, irradiated) with the supported chromium catalyst again (or the supported chromium (II) catalyst again) in the presence of carbon monoxide, such that the overall conversion of the hydrocarbon product is increased after multiple contacts with carbon monoxide and the chromium catalyst (or multiple passes through the reactor containing the chromium catalyst).

If desired, the fifth and sixth processes disclosed herein can further comprise a step of calcining at least a portion (and in some cases, all) of the reduced chromium catalyst to regenerate the supported chromium catalyst. Any suitable calcining conditions can be used, for instance, subjecting the reduced chromium catalyst to an oxidizing atmosphere at any suitable peak temperature and time conditions, such as a peak temperature from 300° C. to 1000° C., from 500° C. to 900° C., or from 550° C. to 870° C., for a time period of from 1 min to 24 hr, from 1 hr to 12 hr, or from 30 min to 8 hr.

The calcining step can be conducted using any suitable technique and equipment, whether batch or continuous. For instance, the calcining step can be performed in a belt calciner or, alternatively, a rotary calciner. In some aspects, the calcining step can be performed in a batch or continuous calcination vessel comprising a fluidized bed. As would be recognized by those of skill in the art, other suitable techniques and equipment can be employed for the calcining step, and such techniques and equipment are encompassed herein.

If desired, the first, second, third, and fourth processes disclosed herein can further comprise a step of reducing at least a portion (and in some cases, all) of the treated chromium catalyst to regenerate the supported chromium (II) catalyst. Any suitable reducing conditions can be used, for instance, subjecting the treated chromium catalyst to a reducing atmosphere, e.g., CO reduction, UV light reduction, elevated temperature reduction, or any combination thereof. As an example, the treated chromium catalyst can be contacted with CO at 150-800° C. (e.g., 350° C.) to form the supported chromium (II) catalyst. Another suitable method is to contact the treated chromium catalyst with light and CO at lower temperatures (e.g., 25° C.) to reduce Cr(VI) and other valent chromium species to chromium (II). Hydrogen also can be used at elevated temperature instead of CO, if desired. This invention is not limited by the method for forming the supported chromium (II) catalyst, as there are other methods for forming chromium (II) readily known to a skilled artisan.

Chromium Catalysts

Generally, the fifth process and the sixth process are applicable to the reduction of any hexavalent chromium catalyst, and are not limited to the reduction of any particular type of supported chromium catalyst comprising chromium in a hexavalent oxidation state. Thus, supported chromium catalysts contemplated herein encompass those prepared by contacting a support with a chromium-containing compound—representative and non-limiting examples of the chromium-compound compound include chromium (III) acetate, basic chromium (III) acetate, chromium (III) acetylacetonate, $Cr_2(SO_4)_3$, $Cr(NO_3)_3$, and $CrO_3$—and calcining in an oxidizing atmosphere to form a supported chromium catalyst. In these aspects, chromium can be impregnated during, or prior to, the calcination step, which can be conducted at a variety of temperatures and time periods, and can be generally selected to convert all or a portion of the chromium to hexavalent chromium. The irradiation or contacting steps disclosed herein can comprise reducing at least a portion of the hexavalent chromium species to a reduced oxidation state—for instance, Cr (II) and/or Cr (III) and/or Cr (IV) and/or Cr (V) species, any of which may be present on the reduced chromium catalyst.

Any suitable chromium-containing compound (or chromium precursor) can be used as a chromium component to prepare the supported chromium catalyst. Illustrative and non-limiting examples of chromium (II) compounds can include chromium (II) acetate, chromium (II) chloride, chromium (II) bromide, chromium (II) iodide, chromium (II) sulfate, and the like, as well as combinations thereof. Likewise, illustrative and non-limiting examples of chromium (III) compounds can include a chromium (III) carboxylate, a chromium (III) naphthenate, a chromium (III) halide, chromium (III) sulfate, chromium (III) nitrate, a chromium (III) dionate, and the like, as well as combinations thereof. In some aspects, the chromium-containing compound can comprise chromium (III) acetate, chromium (III) acetylacetonate, chromium (III) chloride, chromium (III) bromide, chromium (III) sulfate, chromium (III) nitrate, and the like, as well as combinations thereof.

While not required, it can be beneficial for the chromium-containing compound to be soluble in a hydrocarbon solvent during preparation of the supported chromium catalyst. In such situations, the chromium-containing compound can comprise tertiary butyl chromate, a diarene chromium (0) compound, bis-cyclopentadienyl chromium (II), chromium (III) acetylacetonate, chromium acetate, and the like, or any combination thereof. Similarly, and not required, it can be beneficial for the chromium-containing compound to be soluble in water during preparation of the supported chromium catalyst. In such situations, the chromium-containing compound can comprise chromium trioxide, chromium acetate, chromium nitrate, and the like, or any combination thereof.

Other examples include sodium, potassium, or ammonium chromate or dichromate, which is unexpected, because such alkali metal chromates are not usually acceptable for use in polymerization catalysts because of low activity and sintering of the solid support. Thus, the chromium precursor can comprise a chromate compound, e.g., potassium chromate, sodium chromate, ammonium chromate, potassium dichromate, sodium dichromate, ammonium dichromate, and the like, as well as any combination thereof. Since chromium in already in the hexavalent state for these chromate compounds, heat treatment options other than traditional calcining in an oxidizing atmosphere can be used, such as low temperatures (and even an inert atmosphere) to dry or remove excess water/moisture prior to exposing the supported chromium catalyst to light irradiation.

Referring now to the first process, the second process, the third process, the fourth process, the fifth process, and the sixth process, various solid supports can be used for the supported chromium catalyst (or the reduced chromium catalyst, or the supported chromium (II) catalyst, or the treated chromium catalyst), such as conventional solid oxides and zeolites. Generally, the solid oxide can comprise oxygen and one or more elements selected from Group 2, 3, 4, 5, 6, 7, 8, 9, 10, 11, 12, 13, 14, or 15 of the periodic table, or comprise oxygen and one or more elements selected from the lanthanide or actinide elements (See: Hawley's Condensed Chemical Dictionary, 11$^{th}$ Ed., John Wiley & Sons, 1995; Cotton, F. A., Wilkinson, G., Murillo, C. A., and Bochmann, M., Advanced Inorganic Chemistry, 6$^{th}$ Ed., Wiley-Interscience, 1999). For example, the solid oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr. Illustrative examples of solid oxide materials or compounds that can be used as solid support can include, but are not limited to, $Al_2O_3$, $B_2O_3$, BeO, $Bi_2O_3$, CdO, $CO_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof.

The solid oxide can encompass oxide materials such as silica, alumina, or titania, "mixed oxide" compounds thereof such as silica-titania, and combinations or mixtures of more than one solid oxide material. Mixed oxides such as silica-titania can be single or multiple chemical phases with more than one metal combined with oxygen to form the solid oxide. Examples of mixed oxides that can be used as solid oxide include, but are not limited to, silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, and the like, or a combination thereof. In some aspects, the solid support can comprise silica, silica-alumina, silica-coated alumina, silica-titania, silica-titania-magnesia, silica-zirconia, silica-magnesia, silica-boria, aluminophosphate-silica, and the like, or any combination thereof. Silica-coated aluminas are encompassed herein; such oxide materials are described in, for example, U.S. Pat. Nos. 7,884,163 and 9,023,959.

The percentage of each oxide in a mixed oxide can vary depending upon the respective oxide materials. As an example, a silica-alumina (or silica-coated alumina) typically has an alumina content from 5 wt. % to 95 wt. %. According to one aspect, the alumina content of the silica-alumina (or silica-coated alumina) can be from 5 wt. % alumina 50 wt. % alumina, or from 8 wt. % to 30 wt. % alumina. In another aspect, high alumina content silica-aluminas (or silica-coated aluminas) can be employed, in which the alumina content of these materials typically ranges from 60 wt. % alumina to 90 wt. % alumina, or from 65 wt. % alumina to 80 wt. % alumina.

In one aspect, the solid oxide can comprise silica-alumina, silica-coated alumina, silica-titania, silica-zirconia, alumina-titania, alumina-zirconia, zinc-aluminate, alumina-boria, silica-boria, aluminum phosphate, aluminophosphate, aluminophosphate-silica, titania-zirconia, or a combination thereof; alternatively, silica-alumina; alternatively, silica-coated alumina; alternatively, silica-titania; alternatively, silica-zirconia; alternatively, alumina-titania; alternatively, alumina-zirconia; alternatively, zinc-aluminate; alternatively, alumina-boria; alternatively, silica-boria; alternatively, aluminum phosphate; alternatively, aluminophosphate; alternatively, aluminophosphate-silica; or alternatively, titania-zirconia.

In another aspect, the solid oxide can comprise silica, alumina, titania, thoria, stania, zirconia, magnesia, boria, zinc oxide, a mixed oxide thereof, or any mixture thereof. In yet another aspect, the solid support can comprise silica, alumina, titania, or a combination thereof; alternatively, silica; alternatively, alumina; alternatively, titania; alternatively, zirconia; alternatively, magnesia; alternatively, boria; or alternatively, zinc oxide. In still another aspect, the solid oxide can comprise silica, alumina, silica-alumina, silica-coated alumina, aluminum phosphate, aluminophosphate, heteropolytungstate, titania, zirconia, magnesia, boria, zinc oxide, silica-titania, silica-yttria, silica-zirconia, alumina-titania, alumina-zirconia, zinc-aluminate, alumina-boria, silica-boria, aluminophosphate-silica, titania-zirconia, and the like, or any combination thereof.

Consistent with certain aspects of this invention, the supported chromium catalyst (or the reduced chromium catalyst, or the supported chromium (II) catalyst, or the treated chromium catalyst) can comprise a chemically-treated solid oxide as the support, and where the chemically-treated solid oxide comprises a solid oxide (any solid oxide disclosed herein) treated with an electron-withdrawing anion (any electron withdrawing anion disclosed herein). The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, tungstate, molybdate, and the like, including mixtures and combinations thereof. In addition, other ionic or non-ionic compounds that serve as sources for these electron-withdrawing anions also can be employed.

It is contemplated that the electron-withdrawing anion can be, or can comprise, fluoride, chloride, bromide, phosphate, triflate, bisulfate, or sulfate, and the like, or any combination thereof, in some aspects provided herein. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof. Yet, in other aspects, the electron-withdrawing anion can comprise fluoride and/or sulfate.

The chemically-treated solid oxide generally can contain from 1 wt. % to 30 wt. % of the electron-withdrawing anion, based on the weight of the chemically-treated solid oxide. In particular aspects provided herein, the chemically-treated solid oxide can contain from 1 to 20 wt. %, from 2 wt. % to 20 wt. %, from 3 wt. % to 20 wt. %, from 2 wt. % to 15 wt. %, from 1 wt. % to 10 wt. %, from 2 wt. % to 10 wt. %, from 3 wt. % to 10 wt. %, of the electron-withdrawing anion, based on the total weight of the chemically-treated solid oxide.

In an aspect, the chemically-treated solid oxide can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, and the like, as well as any mixture or combination thereof.

In another aspect, the chemically-treated solid oxide employed in the supported chromium catalyst (or the reduced chromium catalyst, or the supported chromium (II) catalyst, or the treated chromium catalyst) and the processes described herein can be, or can comprise, a fluorided solid oxide and/or a sulfated solid oxide, non-limiting examples of which can include fluorided alumina, sulfated alumina, fluorided silica-alumina, sulfated silica-alumina, fluorided silica-zirconia, fluorided silica-coated alumina, sulfated silica-coated alumina, and the like, as well as combinations thereof. Additional information on chemically-treated solid oxide can be found in, for instance, U.S. Pat. Nos. 7,294,599, 7,601,665, 7,884,163, 8,309,485, 8,623,973, and 8,703,886.

Representative examples of supported chromium catalysts, reduced chromium catalysts, supported chromium (II) catalysts, and treated chromium catalysts (in which a solid oxide is the support) include, but are not limited to, chromium/silica, chromium/silica-titania, chromium/silica-zirconia, chromium/silica-titania-magnesia, chromium/silica-alumina, chromium/silica-coated alumina, chromium/aluminophosphate, chromium/alumina, chromium/alumina borate, and the like, or any combination thereof. In one aspect, for instance, the supported chromium catalyst (or the reduced chromium catalyst, or the supported chromium (II) catalyst, or the treated chromium catalyst) can comprise chromium/silica, while in another aspect, the supported chromium catalyst (or the reduced chromium catalyst, or the supported chromium (II) catalyst, or the treated chromium catalyst) can comprise chromium/silica-titania, and in yet another aspect, the supported chromium catalyst (or the reduced chromium catalyst, or the supported chromium (II) catalyst, or the treated chromium catalyst) can comprise chromium/silica-alumina and/or chromium/silica-coated alumina. In circumstances in which the supported chromium catalyst (or the reduced chromium catalyst, or the supported chromium (II) catalyst, or the treated chromium catalyst) comprises chromium/silica-titania (or chromium/silica-zirconia), any suitable amount of titanium (or zirconium) can be present, including from 0.1 to 20 wt. %, from 0.5 to 15 wt. %, from 1 to 10 wt. %, or from 1 to 6 wt. % titanium (or zirconium), based on the total weight of the respective catalyst.

Representative examples of supported chromium catalysts, reduced chromium catalysts, supported chromium (II) catalysts, and treated chromium catalyst catalysts (in which a chemically-treated solid oxide is the support) include, but are not limited to, chromium/sulfated alumina, chromium/fluorided alumina, chromium/fluorided silica-alumina, chromium/fluorided silica-coated alumina, and the like, as well as combinations thereof.

Consistent with certain aspects of this invention, the supported chromium catalyst (or the reduced chromium catalyst, or the supported chromium (II) catalyst, or the treated chromium catalyst) can comprise a zeolite as the support, i.e., a chromium supported zeolite. Any suitable zeolite can be used, for instance, large pore and medium pore zeolites. Large pore zeolites often have average pore diameters in a range of from 7 Å to 12 Å, and non-limiting examples of large pore zeolites include L-zeolite, Y-zeolite, mordenite, omega zeolite, beta zeolite, and the like. Medium pore zeolites often have average pore diameters in a range of from 5 Å to 7 Å. Combinations of zeolitic supports can be used.

Additional representative examples of zeolites that can be used include, for instance, a ZSM-5 zeolite, a ZSM-11 zeolite, an EU-1 zeolite, a ZSM-23 zeolite, a ZSM-57 zeolite, an ALPO4-11 zeolite, an ALPO4-41 zeolite, a Ferrierite framework type zeolite, and the like, or any combination thereof.

In the supported chromium catalyst (or the reduced chromium catalyst, or the supported chromium (II) catalyst, or the treated chromium catalyst), the zeolite can be bound with a support matrix (or binder), non-limiting examples of which can include silica, alumina, magnesia, boria, titania, zirconia, various clays, and the like, including mixed oxides thereof, as well as mixtures thereof. For example, the supported chromium catalyst (or the reduced chromium catalyst, or the supported chromium (II) catalyst, or the treated chromium catalyst) can comprise a binder comprising alumina, silica, a mixed oxide thereof, or a mixture thereof. The zeolite can be bound with the binder using any method known in the art. While not being limited thereto, the supported chromium catalyst (or the reduced chromium catalyst, or the supported chromium (II) catalyst, or the treated chromium catalyst) can comprise a zeolite and from 3 wt. % to 35 wt. % binder; alternatively, from 5 wt. % to 30 wt. % binder; or alternatively, from 10 wt. % to 30 wt. % binder. These weight percentages are based on the total weight of the respective catalyst.

It is worth noting that chromium polymerization catalysts usually require chromium loadings in a rather narrow range, typically from 0.5 to 2 wt. %, because higher amounts degrade the polymer and lower amounts result in low activity. However, no such limitation exists in the present invention. Thus, the amount of chromium in the supported chromium catalyst (or the reduced chromium catalyst, or the supported chromium (II) catalyst, or the treated chromium catalyst) typically can range from 0.01 to 50 wt. %; alternatively, from 0.01 to 20 wt. %; alternatively, from 0.01 to 10 wt. %; alternatively, from 0.05 to 15 wt. %; alternatively, from 0.1 to 15 wt. %; alternatively, from 0.2 to 10 wt. %; alternatively, from 0.1 to 5 wt. %; alternatively, from 0.5 to 30 wt. %; or alternatively, from 0.5 to 2.5 wt. %. These weight percentages are based on the amount of chromium relative to the total weight of the respective catalyst. While not wishing to be bound by theory, it is believed that lower chromium loadings (e.g., 1 wt. % and less) can result in higher selectivity to a particular alcohol compound (or carbonyl compound), while higher chromium loadings (e.g., 5-15 wt. % and above) can result in higher alcohol and/or carbonyl yields per gram of catalyst.

Likewise, the reduced chromium catalyst (in step (i) of the fifth process and/or in step (I) of the sixth process), and which has an average oxidation state of +5 or less, is not particularly limited in the amount of chromium it contains, and it can fall within the same ranges. Thus, the reduced chromium catalyst can contain from 0.01 to 50 wt. %, from 0.01 to 20 wt. %, from 0.01 to 10 wt. %, from 0.05 to 15 wt. %, from 0.1 to 15 wt. %, from 0.2 to 10 wt. %, from 0.1 to 5 wt. %, from 0.5 to 30 wt. %, or from 0.5 to 2.5 wt. % of chromium in an average oxidation state of +5 or less, based on the total weight of the reduced chromium catalyst.

Generally, at least 10 wt. % of the chromium in the supported chromium catalyst (in step (i) of the fifth process and/or in step (I) of the sixth process) is present in a hexavalent oxidation state before the reduction step, and more often at least 20 wt. % is present as chromium (VI). In further aspects, at least 40 wt. %, at least 60 wt. %, at least 80 wt. %, at least 90 wt. %, or at least 95 wt. %, of the chromium in the supported chromium catalyst can be present in an oxidation state of +6. These weight percentages are based on the total amount of chromium. Traditional chromium (VI) catalysts often will have an orange, yellow, or tan color, indicating the presence of chromium (VI).

Conversely, less than or equal to 70 wt. % of the chromium in the hydrocarbon-reduced chromium catalyst is typically present in an oxidation state of +6 (VI), and more often, less than or equal to 50 wt. %, or less than or equal to 40 wt. %. In further aspects, less than or equal to 30 wt. %, or less than or equal to 15 wt. % of chromium in the reduced chromium catalyst can be present in an oxidation state of +6. The minimum amount of chromium (VI) often can be 0 wt. % (no measurable amount), at least 0.5 wt. %, at least 1 wt. %, at least 2 wt. %, or at least 5 wt. %. These weight percentages are based on the total amount of chromium. The reduced chromium catalysts often will have a green, blue, gray, or black color.

Thus, the irradiation or contacting of the supported chromium catalyst with carbon monoxide and the hydrocarbon reactant ordinarily results in at least 10 wt. %, at least 20 wt. %, at least 40 wt. %, at least 60 wt. %, at least 80 wt. %, or at least 90 wt. %, of the supported chromium catalyst being reduced or converted to form the reduced chromium catalyst in step (i) of the fifth process and/or in step (I) of the sixth process.

Additionally or alternatively, the chromium in the reduced chromium catalyst (in step (i) of the fifth process and/or in step (I) of the sixth process) can be characterized by an average valence of less than or equal to 5.25. More often, the chromium in the reduced chromium catalyst has an average valence of less than or equal to 5; alternatively, an average valence of less than or equal to 4.75; alternatively, an average valence of less than or equal to 4.5; alternatively, an average valence of less than or equal to 4.25; or alternatively, an average valence of less than or equal to 4. When the oxygen is added after reduction (sequentially) in the sixth process, these valences may not be reached due to the presence of oxygen. Average valence can be determined using the procedure described in U.S. Patent Publication No. 2020/0086307.

In the first process, the second process, the third process, and the fourth process, the supported chromium (II) catalyst in step (a) or step (A) can contain any suitable amount of chromium (II), such as the ranges for chromium disclosed herein. Thus, the supported chromium (II) catalyst can contain from 0.01 to 50 wt. %, from 0.01 to 20 wt. %, from 0.01 to 10 wt. %, from 0.05 to 15 wt. %, from 0.1 to 15 wt. %, from 0.2 to 10 wt. %, from 0.1 to 5 wt. %, from 0.5 to 30 wt. %, or from 0.5 to 2.5 wt. % of chromium (II), based on the weight of the supported chromium (II) catalyst.

Generally, at least 10 wt. % of the chromium in the supported chromium (II) catalyst (in step (a) or step (A)) is present in a chromium (II) before contacting the hydrocarbon reactant and carbon monoxide, and more often at least 20 wt. % is present as chromium (II). In further aspects, at least 40 wt. %, at least 50 wt. %, at least 75 wt. %, at least 85 wt. %, at least 90 wt. %, or at least 95 wt. %, of the chromium in the supported chromium (II) catalyst can be present as chromium (II).

Conversely, less than or equal to 50 wt. % of the chromium in the supported chromium (II) catalyst is typically present in an oxidation state of +6 (VI), and more often less than or equal to 35 wt. %. In further aspects, less than or equal to 20 wt. %, or less than or equal to 10 wt. % of chromium in the supported chromium (II) catalyst can be present in an oxidation state of +6. Generally, if a chromium catalyst has been reduced effectively, there will be no chromium (VI), or substantially none. Thus, the minimum amount of chromium (VI) often can be 0 wt. % (no measurable amount), at least 0.5 wt. %, at least 1 wt. %, at least 2 wt. %, or at least 5 wt. %. These weight percentages are based on the total amount of chromium.

Additionally or alternatively, the chromium in the supported chromium (II) catalyst in step (a) or step (A) prior to contacting the hydrocarbon reactant and carbon monoxide (with or without irradiation) can be characterized by an average valence of less than or equal to 3.5. More often, the chromium in the supported chromium (II) catalyst has an average valence of less than or equal to 3.25; alternatively, an average valence of less than or equal to 3; alternatively, an average valence of less than or equal to 2.5; or alternatively, an average valence of less than or equal to 2.25.

It is important to note that chromium polymerization catalysts require supports of high porosity so as to allow fragmentation of the catalyst and subsequent egress of the polymer chains, which are hundreds of times longer than the pore diameter in the catalyst. However, in the present invention, no such restriction exists. Thus, the total pore volume of the supported chromium catalyst (or the reduced chromium catalyst, or the supported chromium (II) catalyst, or the treated chromium catalyst) is not particularly limited. For instance, the supported chromium catalyst (or the reduced chromium catalyst, or the supported chromium (II) catalyst, or the treated chromium catalyst) can have a total pore volume in a range from 0.1 to 5 mL/g, from 0.15 to 5 mL/g, from 0.1 to 3 mL/g, from 0.5 to 2.5 mL/g, from 0.15 to 2 mL/g, from 0.3 to 1.5 mL/g, or from 0.5 to 1.0 mL/g. Likewise, the surface area of the supported chromium catalyst (or the reduced chromium catalyst, or the supported chromium (II) catalyst, or the treated chromium catalyst) is not limited to any particular range. Generally, however, the supported chromium catalyst (or the reduced chromium catalyst, or the supported chromium (II) catalyst, or the treated chromium catalyst) can have a BET surface area in a range from 50 to 2000 m$^2$/g, from 50 to 700 m$^2$/g, from 50 to 400 m$^2$/g, from 100 to 1200 m$^2$/g, from 150 to 525 m$^2$/g, or from 200 to 400 m$^2$/g.

The supported chromium catalyst (or the reduced chromium catalyst, or the supported chromium (II) catalyst, or the treated chromium catalyst) can have any suitable shape or form, and such can depend on the type of process that is employed to convert the hydrocarbon reactant and carbon monoxide into the alcohol compound and/or carbonyl compound (e.g., fixed bed versus fluidized bed). Illustrative and non-limiting shapes and forms include powder, round or spherical (e.g., a sphere), ellipsoidal, pellet, bead, cylinder, granule (e.g., regular and/or irregular), trilobe, quadrilobe, ring, wagon wheel, monolith, and the like, as well as any combination thereof. Accordingly, various methods can be utilized to prepare the supported chromium catalyst particles, including, for example, extrusion, spray drying, pelletizing, marumerizing, spherodizing, agglomeration, oil drop, and the like, as well as combinations thereof.

In some aspects, the supported chromium catalyst (or the reduced chromium catalyst, or the supported chromium (II) catalyst, or the treated chromium catalyst) has a relatively small particle size, in which representative ranges for the average (d50) particle size of the catalyst can include from 10 to 500 microns, from 25 to 250 microns, from 20 to 100 microns, from 40 to 160 microns, or from 40 to 120 microns.

In other aspects, the supported chromium catalyst (or the reduced chromium catalyst, or the supported chromium (II) catalyst, or the treated chromium catalyst) can be in the form of pellets or beads—and the like—having an average size ranging from 1/16 inch to 1/2 inch, or from 1/8 inch to 1/4 inch. As noted above, the size of the catalyst particles can be varied to suit the particular process for converting the hydrocarbon reactant and carbon monoxide into the alcohol compound and/or carbonyl compound.

Additional Compositions and Processes

In an aspect of this invention, a composition is provided that contains cyclopentanone (and the composition can be produced when ethylene is used as the hydrocarbon reactant in any of the above-described processes). Cyclopentanone is a cyclic ketone with the following formula:

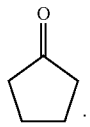

For instance, a composition encompassed herein can comprise cyclopentanone and at least one of the following compounds (thus, as described herein, some carbonyl products formed from the disclosed processes can be dicarbonyls or diketones, linear or cyclic, and with or without unsaturation):

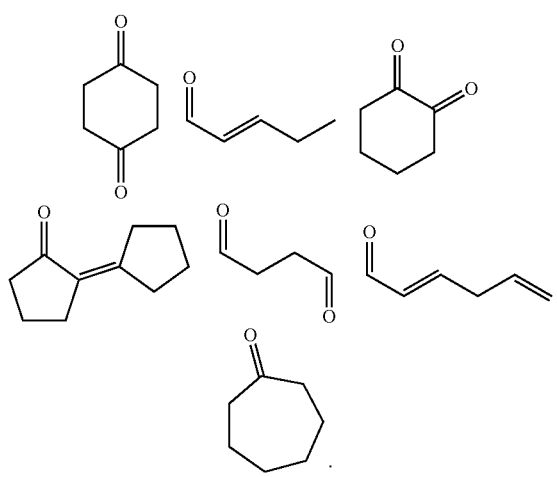

Another aspect of this invention is directed to a process that can form a polyester. One such process can comprise (1) performing any of the first process, the second process, the third process, the fourth process, the fifth process, or the sixth process described herein, wherein the hydrocarbon reactant comprises ethylene, and the carbonyl compound comprises cyclopentanone, (2) oxidizing the cyclopentanone to form valerolactone, and (3) polymerizing valerolactone to form a polyester. Further, any polyester polymers produced in accordance with this process are within the scope of this invention and are encompassed herein.

Another process encompassed herein can comprise (1) performing any of the first process, the second process, the third process, the fourth process, the fifth process, or the sixth process described herein, wherein the hydrocarbon reactant comprises ethylene and wherein instead of removing, (2) contacting the treated chromium catalyst (or the reduced chromium catalyst) and an optional co-catalyst with ethylene and an optional olefin comonomer in a polymerization reactor system under polymerization reaction conditions to produce an ethylene polymer. The ethylene polymer produced can comprise a terminal C=O group. Any suitable ethylene polymer can be produced by this process, such as an ethylene homopolymer and/or an ethylene/α-olefin copolymer, e.g., an ethylene/1-butene copolymer, an ethylene/1-hexene copolymer, and/or an ethylene/1-octene copolymer.

Yet another process encompassed herein can comprise (1) performing any of the first process, the second process, the third process, the fourth process, the fifth process, or the sixth process described herein, wherein the hydrocarbon reactant comprises ethylene and wherein instead of removing, (2) contacting the treated chromium catalyst (or the reduced chromium catalyst) and an optional co-catalyst with ethylene in a polymerization reactor system under polymerization reaction conditions to produce an ethylene/carbon monoxide copolymer. The polymerization reactor system can include at least one loop slurry reactor and/or fluidized bed gas phase reactor, although not limited thereto. Representative polymerization reaction conditions can include a polymerization reaction temperature that can range from 60° C. to 185° C., from 60° C. to 115° C., from 75° C. to 115° C., or from 130° C. to 180° C., and a polymerization reaction pressure that can range from 200 to 1500 psig, from 200 to 1000 psig, from 400 to 1200 psig, from 450 to 850 psig, or from 900 to 1100 psig, although the polymerization reaction temperatures and pressures are not limited solely to these representative ranges.

In this process to produce an ethylene/carbon monoxide copolymer, the weight ratio of CO:ethylene can range from 1:100 to 1:2, such as from 1:100 to 1:10, from 1:50 to 1:2, or from 1:50 to 1:5, and the like. Further, more than one carbon monoxide addition can be utilized, for instance, a first addition to contact the respective chromium catalyst, and a second addition to effect polymerization with the ethylene reactant.

EXAMPLES

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

The Cr(VI) catalyst was a Cr/silica-titania catalyst containing 1 wt. % Cr and 4.2 wt. % Ti, with a BET surface area of 500 m$^2$/g, a pore volume of 2.5 mL/g, and an average particle size of 130 µm. Prior to use, the catalyst was calcined in air at 800-850° C. for 3 hr to form a chromium (VI)/silica-titania catalyst containing ~1 wt. % hexavalent Cr.

The Cr(II) catalyst was prepared from the Cr(VI) catalyst by exposing the chromium (VI)/silica-titania catalyst containing ~1 wt. % hexavalent Cr to carbon monoxide (CO) at 350° C. for 1 hr to form a chromium (II)/silica-titania catalyst containing ~1 wt. % chromium (II).

BET surface areas can be determined using the BET nitrogen adsorption method of Brunauer et al., *J. Am. Chem. Soc.*, 60, 309 (1938) as described in ASTM D1993-91. Total pore volumes can be determined in accordance with Halsey, G. D., *J. Chem. Phys.* (1948), 16, pp. 931. The d50 particle size, or median or average particle size, refers to the particle size for which 50% of the sample by volume has a smaller size and 50% of the sample has a larger size, and can be determined using laser diffraction in accordance with ISO 13320.

Table I summarizes the reaction experiments of Examples 1-22, in which 2-3 grams of the supported chromium (VI) catalyst or the supported chromium (II) catalyst were first charged to an air-tight 100-mL glass container at 25° C. (or a different temperature if specified), followed by the addition of the hydrocarbon reactant (1-2 mL, or 15 psig if ethylene, unless noted otherwise) and carbon monoxide (~5 psig, unless noted otherwise). The glass container was then exposed to a UV light source as noted in Table I (if used). The glass container was slowly rotated at 5-10 rpm to turn over the catalyst particles in the bottle to ensure even exposure of the mixture of the catalyst and carbon monoxide and the hydrocarbon reactant to each other and to the light. For light exposure, the glass container was placed in a box containing a UV light source, where the light bulbs were placed in a plane about 3 inches apart and about 1-2 inches from the container. In Examples 1-8, the UV light source comprised three 15-watt UV LED bulbs (380-405 nm) at a lux of ~75,000-80,000. In Example 9-21, two ZMHA 60-watt LED ultraviolet lamps were used as the light source (380-420 nm), with an output of about 9600 lumens or 250,000 lux. The glass container was placed 1-2 inches away from the bulbs.

Reduction of the supported chromium (VI) catalysts was monitored by the presence of a color change. Each supported chromium catalyst comprising chromium in the hexavalent oxidation state had an orange color which darkened significantly during reduction and/or upon exposing the supported chromium catalyst to light in the presence of the hydrocarbon reactant, and usually assuming a green or blue color, indicating reduction of the supported chromium catalyst starting material, and formation of the reduced chromium catalyst.

In some examples, an oxidizing atmosphere was provided by adding dry air (1 atm) to the 100-mL glass container, after contacting and/or irradiating, but before hydrolysis. This was accomplished by injecting a stream of dry air into the container over about 30 seconds, which usually resulted in an immediate color change. Total exposure time to the air, prior to hydrolysis, was approximately 1 minute.

After the desired contact time or exposure time, the reduced chromium catalyst or the treated chromium catalyst was mixed with a hydrolysis agent to cleave the hydrocarbon-containing ligand(s) from the chromium catalyst. The mixture was stirred for several minutes. The hydrolysis agent used was generally selected so as to not interfere with analysis of the reaction product.

Table I summarizes the results of Examples 1-22, and lists the catalyst type, the reactants, the light treatment, the extra addition (e.g., air), the hydrolysis agent and amount, the total products analyzed/Cr (molar), and an analysis of the reaction product after hydrolysis. The reaction product analysis includes only oxygen-containing products that were derivable from the reductant/reactant and does not include, for example, materials resulting from the hydrolysis agent or its by-products, or oligomers resulting from polymerization. For the oxygenated reaction products, area % from the analytical procedures listed below is roughly equivalent to mol %, thus the results in Table I are shown in mol %.

When ethylene was the hydrocarbon reactant, carboxylic acid products were determined by first neutralizing the product acids with a solution of sodium hydroxide to put them into the ionic form. Then, a small amount of the sample was injected through an ion column designed to separate anions from weak organic acids through an ion chromatography process. A Dionex® IC-3000 instrument with an ICE-AS1 column and guard was used. The test was specifically sensitive to linear carboxylic acids from $C_1$ to $C_6$, glutarate and glycolate ions. Results were reported in micrograms of carboxylate per mL of solution, which was then converted to moles.

When ethylene was the hydrocarbon reactant, lower alcohol products were determined using a GC-MS procedure, with an Agilent® 6890 gas chromatograph having a flame-ionizing detector (FID). It used a Restek® Stapilwax column (P/N 10658) designed and gated specifically to separate and detect light alcohols. The procedure was gated for acetone, methanol, ethanol, isopropanol, n-propanol, isobutanol, n-butanol, t-butanol, 2-butanol, 2-butoxyethanol, acetonitrile and tetrahydrofuran.

For all hydrocarbon reactants, the redox reaction products (and Redox Products/Cr on a molar basis, except for ethylene) were determined using another GC-MS procedure, as follows. Gas chromatography was performed using an Agilent® 7890B GC equipped with both flame ionizing and mass spectral analysis. An all-purpose capillary column (Agilent® J&W® VF-5 ms, 30 m×0.25 mm×0.25 m) was used with variable temperature. Approximate 0.5 µL sample aliquots were injected into a GC port held at 250° C. using a split ratio of 10:1. The carrier gas was ultra-high purity helium and was electronically controlled throughout the run to a constant flow rate of 1.2 mL/min. Initial column temperature was held at 50° C. for 5 min, ramped at 20° C./min to 250° C., and then held at 250° C. for 19 min. Spectral assignment was made via mass correlation using an Agilent® 5977B mass spectrometer connected to the GC unit using electron ionization at 70 eV. The nominal mass range scanned was 14-400 m/z using a scan time of 0.5 sec. Nominal detector voltage used was 1200 V. For calibration purposes, both the FID and MS detectors were used in sequence on the same or reference samples. Identification of peaks was accomplished through an accompanying MS library, and by use of known reference compounds.

Due to the wide range of oxygenated products produced herein, one or all of these three procedures were used to characterize the reaction product after hydrolysis. In some cases, the same compound was detected by more than one technique, and this was subtracted out of the total/Cr (on a molar basis) to prevent double counting of the same compound by more than one analytical technique. For the most part, however, there was very little overlap between the three analytical procedures.

Referring now to the data in Table I, Examples 1-22 demonstrate the reaction of carbon monoxide with olefins (ethylene, cyclopentene, and 1-pentene), alkanes (cyclohexane and n-pentane), or aromatics (toluene) to form alcohol and carbonyl products at ambient temperature (or 0° C.) using a Cr(VI) or Cr(II) catalyst under a variety of irradiation treatments, oxygen exposures, and hydrolysis agents. In general, the presence of oxygen (air) resulted in an unexpected increase in the yield of the oxygenated products, as quantified by redox products/chromium on a molar basis. UV light was not required for the Cr(II) catalyst, and the Cr(II) catalyst typically yielded significantly more oxygenated products than the Cr(VI) catalyst. In some examples, the molar amount of redox products/chromium on a molar basis was over 1:1, and up to almost 6:1. Also, in some examples, certain reaction products were not the result of the reaction of carbon monoxide with the hydrocarbon reactant, but instead were formed directly from the hydrocarbon reactant.

In the examples in which ethylene was the hydrocarbon reactant, and unexpectedly, cyclopentanone was the main product produced, sometimes as the only identifiable product and other times in a mixture with other carbonyl products.

While the focus of these examples was not to maximize chromium conversion (or yield to any particular alcohol or carbonyl compound), the total/Cr molar value in Table I illustrates that significant chromium conversion and alcohol/carbonyl yield can be achieved, depending of course on the hydrocarbon reactant, the catalyst type (and chromium loading), the irradiation conditions, and the presence of oxygen, among other factors.

TABLE I

Summary of Examples (products in mol per mol Cr)

| Example | Catalyst | Reactants | UV Light | Extra Addition | Hydrolysis Amount | Hydrolysis Agent | Product/Cr | Product(s) |
|---|---|---|---|---|---|---|---|---|
| 1 | Cr(VI) | CO + ethylene | 60 hr | N/A | 15 mL | 5% $H_2O$/MeOH | 0.067 | cyclopentanone |
| | | | | | | | 0.006 | $C_5H_8O$ (2-pentenal) |
| 2 | Cr(II) | CO + ethylene | 60 hr | N/A | 15 mL | 5% $H_2O$/MeOH | 0.674 | cyclopentanone |
| | | | | | | | 0.036 | $C_6H_8O$ (ketone) |
| | | | | | | | 0.030 | $C_{10}H_{14}O_2$ (cyclopentylidene-cyclopentanone) |
| | | | | | | | 0.023 | $C_6H_8O$ (ketone) |
| | | | | | | | 0.012 | $C_7H_{12}O$ (ketone) |
| | | | | | | | 0.011 | $C_5H_8O_2$ |
| 3 | Cr(II) | Ethylene | 70 min | Air | 15 mL | 5% $H_2O$/MeOH | Clean | |
| 4 | Cr(II) | Ethylene | 70 min | CO | 15 mL | 5% $H_2O$/MeOH | 0.036 | cyclopentanone |
| 5 | Cr(II) | 2 mL cyclohexane + 5 psig CO | 70 min | CO | 15 mL | 5% $H_2O$/MeOH | trace | cyclohexanol |
| 6 | Cr(II) | 2 mL cyclohexane + 5 psig CO | 70 min | Air | 15 mL | 5% $H_2O$/MeOH | 1.194 | cyclohexanol |
| | | | | | | | 0.284 | 2-cyclohexen-1-one |
| | | | | | | | 0.221 | cyclohexanone |
| | | | | | | | 0.193 | $C_7H_{14}O$ |
| | | | | | | | 0.046 | cyclohexene oxide |
| | | | | | | | 0.012 | $C_7H_{14}O_3$ or $C_8H_{16}O_2$ or $C_7H_{14}O$ |
| 7 | Cr(II) | CO + 2 mL cyclopentene | 18 hr | N/A | 15 mL | 4% $H_2O$/MeOH | 0.611 | $C_{10}H_{16}$ (1-cyclopentyl-cyclopentene, or bicyclopentylidene) |
| | | | | | | | 0.248 | $C_{10}H_{16}$ (1-cyclopentyl-cyclopentene, or bicyclopentylidene) |

TABLE I-continued

Summary of Examples (products in mol per mol Cr)

| Example | Catalyst | Reactants | UV Light | Extra Addition | Hydrolysis Amount | Hydrolysis Agent | Product/Cr | Product(s) |
|---|---|---|---|---|---|---|---|---|
| | | | | | | | 0.091 | 3-cyclopentyl-cyclopentene |
| | | | | | | | 0.042 | $C_{10}H_{16}$ |
| | | | | | | | 0.020 | $C_{15}H_{24}$ or $C_{12}$ oxygenate |
| | | | | | | | 0.019 | $C_{12}$-$C_{14}$ oxygenate |
| 8 | Cr(II) | 2 mL toluene 0 C. 1 hr, CO 25 C. | 18 hr | N/A | 15 mL | 4% $H_2O$/MeOH | clean | |
| 9 | Cr(VI) | CO 10 min, then 1 mL n-pentane | 3.5 hr | N/A | 15 mL | 10% $H_2O$/EtOH | 0.002 | $C_6H_{14}O_2$ or $C_6H_{14}O$ |
| | | | | | | | 0.002 | $C_6H_{12}O$ |
| 10 | Cr(VI) | CO 10 min, then 1 mL n-pentane | 3.5 hr | N/A | 15 mL | 10% $H_2O$/EtOH | 0.001 | $C_6H_{12}O$ |
| 11 | Cr(VI) | CO 10 min, then 1 mL 1-pentene | 3.5 hr | Air | 15 mL | 10% $H_2O$/EtOH | 0.005 | 1-hexanol |
| | | | | | | | 0.008 | $C_6H_{12}O$ |
| | | | | | | | 0.017 | $C_6H_{14}O$ or $C_6H_{14}O_2$ |
| | | | | | | | 0.007 | $C_7H_{16}O$ |
| | | | | | | | 0.040 | 3-hexanol |
| | | | | | | | 0.004 | $C_6H_{14}O_3$ |
| | | | | | | | 0.003 | $C_{11}H_{20}O_2$ |
| | | | | | | | 0.009 | $C_{11}H_{20}O$ |
| | | | | | | | 0.012 | $C_{11}H_{20}O$ |
| | | | | | | | 0.006 | $C_{11}H_{18}O$ |
| 12 | Cr(VI) | CO 10 min, then 1 mL 1-pentene | 3.5 hr | N/A | 15 mL | 10% $H_2O$/EtOH | 0.005 | 1-hexanol |
| | | | | | | | 0.004 | $C_6H_{12}O_2$ |
| | | | | | | | 0.003 | $C_7H_{14}O$ |
| | | | | | | | 0.006 | $C_8H_{14}O_2$ |
| | | | | | | | 0.011 | $C_{11}H_{20}O$ |
| | | | | | | | 0.016 | $C_{11}H_{20}O$ |
| | | | | | | | 0.004 | $C_{11}H_{20}O$ |
| | | | | | | | 0.004 | $C_{11}H_{18}O$ |
| 13 | Cr(II) | CO 10 min, then 1 mL n-pentane | 3.5 hr | Air | 15 mL | 10% $H_2O$/EtOH | clean | |
| 14 | Cr(II) | CO 10 min, then 1 mL n-pentane | 3.5 hr | N/A | 15 mL | 10% $H_2O$/EtOH | clean | |
| 15 | Cr(II) | CO 10 min, then 1 mL 1-pentene | 3.5 hr | Air | 15 mL | 10% $H_2O$/EtOH | 0.003 | 1-hexanol |
| | | | | | | | 0.027 | $C_6H_{14}O$ |
| | | | | | | | 0.012 | $C_6H_{14}O$ |
| | | | | | | | 0.037 | $C_7H_{16}O_2$ |
| | | | | | | | 0.006 | $C_7H_{14}O$ |
| 16 | Cr(II) | CO 10 min, then 1 mL 1-pentene | 3.5 hr | N/A | 15 mL | 10% $H_2O$/EtOH | clean | |
| 17 | Cr(II) | 2 mL n-pentane 1 h, CO 1 h | 2 hr total | Air | 15 mL | 10% $H_2O$/EtOH | clean | |
| 18 | Cr(II) | 2 mL n-pentane 1 h, CO 1 h | 2 hr total | N/A | 15 mL | 10% $H_2O$/EtOH | clean | |
| 19 | Cr(VI) | 2 mL n-pentane 1 h, CO 1 h | 2 hr total | Air | 15 mL | 10% $H_2O$/EtOH | 0.002 | $C_6H_{14}O$ |
| 20 | Cr(VI) | 2 mL n-pentane 1 h, CO 1 h | 2 hr total | N/A | 15 mL | 10% $H_2O$/EtOH | clean | |
| 21 | Cr(VI) | 25 psig CO, 10 psig ethylene | 30 hr | N/A | 15 mL | 5% $H_2O$/MeOH | 0.153 | cyclopentanone |
| 22 | Cr(II) | 25 psig CO, 10 psig ethylene | Dark 30 hr | N/A | 15 mL | 5% $H_2O$/MeOH | 5.44 | cyclopentanone |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A process comprising:

(a) contacting a hydrocarbon reactant, carbon monoxide, and a supported chromium (II) catalyst to form a treated chromium catalyst; and (b) removing from the treated chromium catalyst a reaction product comprising an alcohol compound and/or a carbonyl compound (e.g., a ketone or aldehyde compound).

Aspect 2. A process comprising:
(a) irradiating a hydrocarbon reactant, carbon monoxide, and a supported chromium catalyst (II) catalyst with a light beam at a wavelength in the UV-visible spectrum to form a treated chromium catalyst; and
(b) removing from the treated chromium catalyst a reaction product comprising an alcohol compound and/or a carbonyl compound (e.g., a ketone or aldehyde compound).

Aspect 3. A process comprising:
(A) contacting a hydrocarbon reactant, carbon monoxide, and a supported chromium (II) catalyst to form a treated chromium catalyst;
(B) subjecting the treated chromium catalyst to an oxidizing atmosphere; and
(C) removing from the treated chromium catalyst a reaction product comprising an alcohol compound and/or a carbonyl compound (e.g., a ketone or aldehyde compound).

Aspect 4. A process comprising:
(A) irradiating a hydrocarbon reactant, carbon monoxide, and a supported chromium catalyst (II) catalyst with a light beam at a wavelength in the UV-visible spectrum to form a treated chromium catalyst;
(B) subjecting the treated chromium catalyst to an oxidizing atmosphere; and
(C) removing from the treated chromium catalyst a reaction product comprising an alcohol compound and/or a carbonyl compound (e.g., a ketone or aldehyde compound).

Aspect 5. The process defined in any one of aspects 1-4, wherein the supported chromium (II) catalyst in step (a) or step (A) comprises any suitable amount of chromium (II) or an amount in any range disclosed herein, e.g., from 0.01 to 50 wt. %, from 0.01 to 10 wt. %, from 0.05 to 15 wt. %, from 0.1 to 15 wt. %, from 0.2 to 10 wt. %, from 0.1 to 5 wt. %, from 0.5 to 30 wt. %, or from 0.5 to 2.5 wt. % of chromium (II), based on the weight of the supported chromium (II) catalyst.

Aspect 6. The process defined in any one of aspects 1-5, wherein the supported chromium (II) catalyst in step (a) or step (A) comprises at least 20 wt. %, at least 50 wt. %, at least 75 wt. %, at least 85 wt. %, at least 90 wt. %, or at least 95 wt. % of chromium (II), based on the total amount of chromium, and/or the supported chromium (II) catalyst in step (a) or step (A) comprises (from 0 wt. %, from 0.5 wt. %, from 1 wt. %, or from 2 wt. %) to less than or equal to 50 wt. %, less than or equal to 35 wt. %, less than or equal to 20 wt. %, or less than or equal to 10 wt. % of chromium (VI), based on the total amount of chromium.

Aspect 7. The process defined in any one of aspects 1-6, wherein the chromium in the supported chromium (II) catalyst in step (a) or step (A) has an average valence of less than or equal to 3.5, less than or equal to 3.25, less than or equal to 3, or less than or equal to 2.5.

Aspect 8. The process defined in any one of aspects 1-7, wherein the yield to the alcohol compound (or the carbonyl compound) per mole of chromium (II) in the supported chromium (II) catalyst is any molar ratio based on moles of chromium (II) disclosed herein, e.g., at least 0.01, at least 0.025, at least 0.05, at least 0.1, or at least 0.25 moles (and up to 100, up to 10, up to 8, up to 5, up to 3, up to 2, up to 1.5, or up to 1 mole) of the alcohol compound (or the carbonyl compound).

Aspect 9. A process comprising:
(i) irradiating a hydrocarbon reactant, carbon monoxide, and a supported chromium catalyst comprising chromium in a hexavalent oxidation state with a light beam at a wavelength in the UV-visible spectrum to reduce at least a portion of the supported chromium catalyst to form a reduced chromium catalyst; and
(ii) removing from the reduced chromium catalyst a reaction product comprising an alcohol compound and/or a carbonyl compound (e.g., a ketone or aldehyde compound).

Aspect 10. A process comprising:
(I) irradiating a hydrocarbon reactant, carbon monoxide, and a supported chromium catalyst comprising chromium in a hexavalent oxidation state with a light beam at a wavelength in the UV-visible spectrum to reduce at least a portion of the supported chromium catalyst to form a reduced chromium catalyst;
(II) subjecting the reduced chromium catalyst to an oxidizing atmosphere; and
(III) removing from the reduced chromium catalyst a reaction product comprising an alcohol compound and/or a carbonyl compound (e.g., a ketone or aldehyde compound).

Aspect 11. The process defined in aspect 9 or 10, wherein the reduced chromium catalyst in step (i) or step (I) comprises any suitable amount of chromium in an average oxidation state of +5 or less, or an amount in any range disclosed herein, e.g., from 0.01 to 50 wt. %, from 0.01 to 10 wt. %, from 0.05 to 15 wt. %, from 0.1 to 15 wt. %, from 0.2 to 10 wt. %, from 0.1 to 5 wt. %, from 0.5 to 30 wt. %, or from 0.5 to 2.5 wt. % of chromium in an average oxidation state of +5 or less, based on the weight of the reduced chromium catalyst.

Aspect 12. The process defined in any one aspects 9-11, wherein the amount of the chromium of the supported chromium catalyst in a hexavalent oxidation state in step (i) or step (I) is at least 10 wt. %, at least 20 wt. %, at least 40 wt. %, at least 60 wt. %, at least 80 wt. %, or at least 90 wt. %, based on the total amount of chromium on the supported chromium catalyst, and/or the amount of chromium of the reduced chromium catalyst in a hexavalent oxidation state in step (i) or step (I) is (from 0 wt. %, from 0.5 wt. %, from 1 wt. %, or from 2 wt. % to) less than or equal to 50 wt. %, less than or equal to 40 wt. %, less than or equal to 30 wt. %, or less than or equal to 15 wt. %, based on the total amount of chromium on the reduced chromium catalyst.

Aspect 13. The process defined in any one of aspects 9-12, wherein at least 10 wt. % at least 20 wt. %, at least 40 wt. %, at least 60 wt. %, at least 80 wt. %, or at least 90 wt. % of the supported chromium catalyst is reduced to form the reduced chromium catalyst in step (i) or step (I), based on the total amount of the supported chromium catalyst.

Aspect 14. The process defined in any one of aspects 9-13, wherein the chromium in the reduced chromium catalyst in step (i) or step (I) has an average valence of less than or equal to 5.5, less than or equal to 5.25, less than or equal to 5, less than or equal to 4.5, less than or equal to 4.25, or less than or equal to 4.

Aspect 15. The process defined in any one of aspects 9-14, wherein the yield to the alcohol compound (or the carbonyl compound) per mole of chromium (VI) in the supported chromium catalyst is any molar ratio based on moles of chromium (VI) disclosed herein, e.g., at least 0.01, at least 0.025, at least 0.05, at least 0.1, or at least 0.25 moles (and up to 100, up to 10, up to 8, up to 5, up to 3, up to 2, up to 1.5, or up to 1 mole) of the alcohol compound (or the carbonyl compound).

Aspect 16. The process defined in any one of the preceding aspects, wherein the irradiating step (or contacting step) is conducted at any suitable temperature or any temperature disclosed herein, e.g., less than 300° C., less than 200° C., less than 100° C., less than 40° C., from −100° C. to 100° C., from 0° C. to 100° C., from 20° C. to 100° C., or from 10° C. to 40° C.

Aspect 17. The process defined in any one of the preceding aspects, wherein the irradiating step (or contacting step) is conducted for any suitable exposure time (or contact time) or for any exposure time (or contact time) disclosed herein, e.g., from 15 sec to 48 hr, from 1 min to 6 hr, from 1 min to 15 min, or from 1 hr to 8 hr.

Aspect 18. The process defined in any one of the preceding aspects, wherein the molar ratio of the hydrocarbon reactant (or the molar ratio of elemental oxygen or other oxidizing agent) to chromium (of the respective catalyst) is in any suitable range or any range disclosed herein, e.g., at least 0.25:1, at least 0.5:1, at least 1:1, at least 10:1, at least 100:1, at least 1000:1, or at least 10,000:1.

Aspect 19. The process defined in any one of aspects 1-18, wherein the process comprises irradiating (or contacting) a slurry of the respective catalyst in the hydrocarbon reactant.

Aspect 20. The process defined in any one of aspects 1-18, wherein the process comprises contacting the hydrocarbon reactant with a fluidized bed of the respective catalyst, and irradiating while contacting (fluidizing) if applicable.

Aspect 21. The process defined in any one of aspects 1-18, wherein the process comprises contacting the hydrocarbon reactant (e.g., in a gas phase or in a liquid phase) with a fixed bed of the respective catalyst, and irradiating while contacting if applicable.

Aspect 22. The process defined in any one of the preceding aspects, wherein the step of irradiating (or contacting) the hydrocarbon reactant with the respective catalyst is conducted at any suitable WHSV or a WHSV in any range disclosed herein, e.g., from 0.01 h$^{-1}$ to 500 hr$^{-1}$, or from 0.1 h$^{-1}$ to 10 hr$^{-1}$.

Aspect 23. The process defined in any one of the preceding aspects, wherein the supported chromium catalyst (or the reduced chromium catalyst, or the supported chromium (II) catalyst, or the treated chromium catalyst) comprises any suitable amount of chromium or an amount in any range disclosed herein, e.g., from 0.01 to 50 wt. %, from 0.01 to 10 wt. %, from 0.05 to 15 wt. %, from 0.1 to 15 wt. %, from 0.2 to 10 wt. %, from 0.1 to 5 wt. %, from 0.5 to 30 wt. %, or from 0.5 to 2.5 wt. % of chromium, based on the weight of the respective catalyst.

Aspect 24. The process defined in any one of aspects 1-23, wherein the supported chromium catalyst (or the reduced chromium catalyst, or the supported chromium (II) catalyst, or the treated chromium catalyst) comprises any suitable solid oxide or any solid oxide disclosed herein, e.g., silica, alumina, silica-alumina, silica-coated alumina, aluminum phosphate, aluminophosphate, heteropolytungstate, titania, zirconia, magnesia, boria, zinc oxide, silica-titania, silica-zirconia, alumina-titania, alumina-zirconia, zinc-aluminate, alumina-boria, alumina borate, silica-boria, aluminophosphate-silica, titania-zirconia, or any combination thereof.

Aspect 25. The process defined in any one of aspects 1-23, wherein the supported chromium catalyst (or the reduced chromium catalyst, or the supported chromium (II) catalyst, or the treated chromium catalyst) comprises silica, silica-alumina, silica-coated alumina, silica-titania, silica-titania-magnesia, silica-zirconia, silica-magnesia, silica-boria, aluminophosphate-silica, alumina, alumina borate, or any combination thereof.

Aspect 26. The process defined in any one of aspects 1-23, wherein the supported chromium catalyst (or the reduced chromium catalyst, or the supported chromium (II) catalyst, or the treated chromium catalyst) comprises a chemically-treated solid oxide comprising a solid oxide (e.g., as in aspect 24 or 25, such as silica, alumina, silica-alumina, silica-titania, silica-zirconia, silica-yttria, aluminophosphate, zirconia, titania, thoria, or stania) treated with an electron-withdrawing anion.

Aspect 27. The process defined in aspect 26, wherein the electron-withdrawing anion comprises sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, tungstate, molybdate, or any combination thereof.

Aspect 28. The process defined in aspect 26 or 27, wherein the chemically-treated solid oxide contains from 1 to 30 wt. %, from 2 to 20 wt. %, from 2 to 15 wt. %, from 2 to 10 wt. %, or from 3 to 10 wt. %, of the electron-withdrawing anion, based on the total weight of the chemically-treated solid oxide.

Aspect 29. The process defined in any one of aspects 1-23, wherein the supported chromium catalyst (or the reduced chromium catalyst, or the supported chromium (II) catalyst, or the treated chromium catalyst) comprises a chemically-treated solid oxide comprising fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, fluorided-chlorided silica-coated alumina, sulfated silica-coated alumina, phosphated silica-coated alumina, or any combination thereof.

Aspect 30. The process defined in any one of aspects 1-23, wherein the supported chromium catalyst (or the reduced chromium catalyst, or the supported chromium (II) catalyst, or the treated chromium catalyst) comprises chromium/silica, chromium/silica-titania, chromium/silica-titania-magnesia, chromium/silica-alumina, chromium/silica-coated alumina, chromium/aluminophosphate, chromium/alumina, chromium/alumina borate, or any combination thereof.

Aspect 31. The process defined in any one of aspects 1-23, wherein the supported chromium catalyst (or the reduced chromium catalyst, or the supported chromium (II) catalyst, or the treated chromium catalyst) comprises chromium/silica-titania, and the respective catalyst comprises any suitable amount of titanium or an amount in any range disclosed herein, e.g., from 0.1 to 20 wt. %, from 0.5 to 15 wt. %, from 1 to 10 wt. %, or from 1 to 6 wt. %, based on the weight of the respective catalyst.

Aspect 32. The process defined in any one of aspects 1-23, wherein the supported chromium catalyst (or the reduced chromium catalyst, or the supported chromium (II) catalyst, or the treated chromium catalyst) comprises chromium/sulfated alumina, chromium/fluorided alumina, chromium/fluorided silica-alumina, chromium/fluorided silica-coated alumina, or any combination thereof.

Aspect 33. The process defined in any one of aspects 1-23, wherein the supported chromium catalyst (or the reduced chromium catalyst, or the supported chromium (II) catalyst, or the treated chromium catalyst) comprises a zeolite.

Aspect 34. The process defined in aspect 33, wherein the supported chromium catalyst (or the reduced chromium catalyst, or the supported chromium (II) catalyst, or the treated chromium catalyst) comprises a medium pore zeolite, a large pore zeolite, or a combination thereof.

Aspect 35. The process defined in aspect 33, wherein the zeolite comprises a ZSM-5 zeolite, a ZSM-11 zeolite, an EU-1 zeolite, a ZSM-23 zeolite, a ZSM-57 zeolite, an ALPO4-11 zeolite, an ALPO4-41 zeolite, a Ferrierite framework type zeolite, or a combination thereof.

Aspect 36. The process defined in aspect 33, wherein the supported chromium catalyst (or the reduced chromium catalyst, or the supported chromium (II) catalyst, or the treated chromium catalyst) comprises an L-zeolite, a Y-zeolite, a mordenite, an omega zeolite, and/or a beta zeolite.

Aspect 37. The process defined in any one of aspects 33-36, wherein the supported chromium catalyst (or the reduced chromium catalyst, or the supported chromium (II) catalyst, or the treated chromium catalyst) comprises the zeolite and any suitable amount of binder or an amount in any range disclosed herein, e.g., from 3 wt. % to 35 wt. %, or from 5 wt. % to 30 wt. % binder, based on the weight of the respective catalyst.

Aspect 38. The process defined in any one of the preceding aspects, wherein the supported chromium catalyst (or the reduced chromium catalyst, or the supported chromium (II) catalyst, or the treated chromium catalyst) has any suitable pore volume (total) or a pore volume (total) in any range disclosed herein, e.g., from 0.1 to 5 mL/g, from 0.15 to 5 mL/g, from 0.1 to 3 mL/g, from 0.15 to 2 mL/g, from 0.3 to 1.5 mL/g, or from 0.5 to 1.0 mL/g.

Aspect 39. The process defined in any one of the preceding aspects, the supported chromium catalyst (or the reduced chromium catalyst, or the supported chromium (II) catalyst, or the treated chromium catalyst) has any suitable BET surface area or a BET surface area in any range disclosed herein, e.g., from 50 to 2000 $m^2/g$, from 50 to 700 $m^2/g$, from 50 to 400 $m^2/g$, from 100 to 1200 $m^2/g$, or from 150 to 525 $m^2/g$.

Aspect 40. The process defined in any one of the preceding aspects, wherein the supported chromium catalyst (or the reduced chromium catalyst, or the supported chromium (II) catalyst, or the treated chromium catalyst) is in any suitable shape or form or any shape or form disclosed herein, e.g., powder, round or spherical (e.g., spheres), ellipsoidal, pellet, bead, cylinder, granule (e.g., regular and/or irregular), trilobe, quadralobe, ring, wagonwheel, monolith, or any combination thereof.

Aspect 41. The process defined in any one aspects 1-40, wherein the supported chromium catalyst (or the reduced chromium catalyst, or the supported chromium (II) catalyst, or the treated chromium catalyst) has any suitable average (d50) particle size or an average (d50) particle size in any range disclosed herein, e.g., from 10 to 500 microns, from 25 to 250 microns, or from 20 to 100 microns.

Aspect 42. The process defined in any one aspects 1-40, wherein the supported chromium catalyst (or the reduced chromium catalyst, or the supported chromium (II) catalyst, or the treated chromium catalyst) comprises pellets or beads having any suitable average size or an average size in any range disclosed herein, e.g., from 1/16 inch to 1/2 inch, or from 1/8 inch to 1/4 inch.

Aspect 43. The process defined in any one of aspects 1-42, wherein the hydrocarbon reactant is in a gas phase during the irradiating (or contacting) step.

Aspect 44. The process defined in any one of aspects 1-42, wherein the hydrocarbon reactant is in a liquid phase during the irradiating (or contacting) step.

Aspect 45. The process defined in any one of the preceding aspects, wherein the removing step comprises hydrolyzing the reduced chromium catalyst (or the treated chromium catalyst) to form the reaction product comprising the alcohol compound and/or the carbonyl compound.

Aspect 46. The process defined in aspect 45, wherein hydrolyzing is conducted at any suitable temperature or any temperature disclosed herein, e.g., less than 200° C., less than 100° C., less than 40° C., from 0° C. to 100° C., or from 10° C. to 40° C.

Aspect 47. The process defined in aspect 45 or 46, wherein hydrolyzing comprises contacting the reduced chromium catalyst (or the treated chromium catalyst) with a hydrolysis agent.

Aspect 48. The process defined in aspect 47, wherein the hydrolysis agent comprises any suitable hydrolysis agent or any hydrolysis agent disclosed herein, e.g., water, steam, an alcohol agent, an acid agent, an alkaline agent, or any combination thereof.

Aspect 49. The process defined in aspect 47 or 48, wherein the hydrolysis agent further comprises any suitable reducing agent or any reducing agent disclosed herein, e.g., ascorbic acid, an iron (II) reducing agent, ferrous (II) ions, a zinc reducing agent, sodium bisulfite, sodium thiosulfate, sodium sulfide, or any combination thereof.

Aspect 50. The process defined in any one aspects 1-44, wherein the removing step comprises subjecting the reduced chromium catalyst (or the treated chromium catalyst) to hydrogen ($H_2$) or to an inert atmosphere and an elevated temperature to form the reaction product comprising the alcohol compound and/or the carbonyl compound.

Aspect 51. The process defined in any one aspects 1-44, wherein the removing step comprises subjecting the reduced chromium catalyst (or the treated chromium catalyst) to a pressure swing desorption process to form the reaction product comprising the alcohol compound and/or the carbonyl compound.

Aspect 52. The process defined in any one aspects 1-44, wherein the removing step comprises subjecting the reduced chromium catalyst (or the treated chromium catalyst) to a temperature swing desorption process to form the reaction product comprising the alcohol compound and/or the carbonyl compound.

Aspect 53. The process defined in any one aspects 1-44, wherein the removing step comprises subjecting the reduced chromium catalyst (or the treated chromium catalyst) to an air desorption process to form the reaction product comprising the alcohol compound and/or the carbonyl compound.

Aspect 54. The process defined in any one of the preceding aspects, wherein the oxidizing atmosphere comprises any suitable oxidizing atmosphere or any oxidizing atmosphere disclosed herein, e.g., oxygen, air, a mixture of air and an inert gas (such as nitrogen), a mixture of oxygen and an inert gas, NO, $NO_2$, $N_2O$, ozone, a halide oxide, $H_2O_2$, an organic peroxide, as well as combinations thereof.

Aspect 55. The process defined in any one of the preceding aspects, wherein the subjecting step is conducted at any suitable temperature or any temperature disclosed herein, e.g., less than 200° C., less than 100° C., less than 40° C., from −100° C. to 100° C., from 0° C. to 100° C., or from 10° C. to 40° C.

Aspect 56. The process defined in any one of the preceding aspects, wherein the subjecting step is conducted for any suitable time period or for any time period disclosed herein, e.g., from 15 sec to 48 hr, from 1 min to 6 hr, from 1 min to 15 min, or from 1 hr to 8 hr.

Aspect 57. The process defined in any one of the preceding aspects, further comprising a step of separating at least a portion (and in some cases, all) of the hydrocarbon reactant from the reaction product after the removing step to produce a separated hydrocarbon portion using any suitable technique or any technique disclosed herein, e.g., extraction, filtration, evaporation, distillation, or any combination thereof.

Aspect 58. The process defined in aspect 57, wherein the separated hydrocarbon portion is recycled and irradiated (or contacted) with the supported chromium catalyst (or the supported chromium (II) catalyst) again.

Aspect 59. The process defined in any one of the preceding aspects, further comprising a step of separating at least a portion (and in some cases, all) of the alcohol compound and/or the carbonyl compound from the reaction product using any suitable technique or any technique disclosed herein, e.g., extraction, filtration, evaporation, distillation, or any combination thereof.

Aspect 60. The process defined in any one of the preceding aspects, further comprising a step of separating at least a portion (and in some cases, all) of the reduced chromium catalyst (or the treated chromium catalyst) from the reaction product after the removing step to produce a separated reduced chromium catalyst (or a separated treated chromium catalyst) using any suitable technique or any technique disclosed herein, e.g., extraction, filtration, evaporation, distillation, or any combination thereof.

Aspect 61. The process defined in any one of aspects 1-60, further comprising a step of calcining the reduced chromium catalyst or the separated reduced chromium catalyst to regenerate the supported chromium catalyst.

Aspect 62. The process defined in aspect 61, wherein calcining comprises subjecting the reduced chromium catalyst or the separated reduced chromium catalyst to an oxidizing atmosphere at any suitable peak temperature and time conditions or any peak temperature and time conditions disclosed herein, e.g., a peak temperature from 300° C. to 1000° C., from 500° C. to 900° C., or from 550° C. to 870° C., for a time period of from 1 min to 24 hr, from 1 hr to 12 hr, or from 30 min to 8 hr.

Aspect 63. The process defined in any one of aspects 1-60, further comprising a step of reducing the treated chromium catalyst or the separated treated chromium catalyst to regenerate the supported chromium (II) catalyst.

Aspect 64. The process defined in aspect 63, wherein reducing comprises subjecting the treated chromium catalyst or the separated treated chromium catalyst to a reducing atmosphere, e.g., CO reduction, UV light reduction, elevated temperature reduction, or any combination thereof.

Aspect 65. The process defined in any one of the preceding aspects, wherein the molar ratio of the hydrocarbon reactant to carbon monoxide is in any suitable range or any range disclosed herein, e.g., from 0.01:1 to 250:1, from 0.1:1 to 50:1, from 0.1:1 to 10:1, from 0.2:1 to 8:1, or from 0.5:1 to 5:1.

Aspect 66. The process defined in any one of the preceding aspects, wherein a conversion of the hydrocarbon reactant (or a yield to the alcohol compound, or a yield to the carbonyl compound) is any percent conversion (or yield) disclosed herein, e.g., at least 2 wt. %, at least 5 wt. %, at least 10 wt. %, or at least 15 wt. % (and up to 99 wt. %, 95 wt. %, 90 wt. %, 80 wt. %, 70 wt. %, or 50 wt. %).

Aspect 67. The process defined in any one of the preceding aspects, wherein a single pass conversion of the hydrocarbon reactant (or a single pass yield to the alcohol compound, or a single pass yield to the carbonyl compound) is any single pass percent conversion (or single pass yield) disclosed herein, e.g., at least 2 wt. %, at least 5 wt. %, at least 10 wt. %, or at least 15 wt. % (and up to 99 wt. %, 95 wt. %, 90 wt. %, 80 wt. %, 70 wt. %, or 50 wt. 0%).

Aspect 68. The process defined in any one of the preceding aspects, wherein the carbonyl compound comprises an aldehyde compound, a ketone compound, an organic acid compound, or any combination thereof, additionally or alternatively, the alcohol compound comprises a diol, an allylic alcohol, a phenol, or any combination thereof.

Aspect 69. The process defined in any one of the preceding aspects, wherein the carbonyl compound comprises a ketone compound, an aldehyde compound, or both.

Aspect 70. The process defined in any one of aspects 1-69, wherein the hydrocarbon reactant comprises a saturated or an unsaturated, linear or branched or cyclic, aliphatic hydrocarbon, and including combinations thereof.

Aspect 71. The process defined in any one of aspects 1-69, wherein the hydrocarbon reactant comprises an aromatic compound (e.g., benzene, toluene, xylene, styrene, and substituted versions thereof, and including combinations thereof).

Aspect 72. The process defined in any one of aspects 1-69, wherein the hydrocarbon reactant comprises a linear alkane compound, a branched alkane compound, a cyclic alkane compound, or a combination thereof.

Aspect 73. The process defined in any one of aspects 1-69, wherein the hydrocarbon reactant comprises a linear olefin compound (e.g., an α-olefin), a branched olefin compound, a cyclic olefin compound, or a combination thereof.

Aspect 74. The process defined in any one of aspects 1-69, wherein the hydrocarbon reactant comprises any suitable carbon number alkane compound or any carbon number alkane compound disclosed herein, e.g., a $C_1$ to $C_{36}$ alkane compound, a $C_1$ to $C_{18}$ alkane compound, a $C_1$ to $C_{12}$ alkane compound, or a $C_1$ to $C_8$ alkane compound; and/or the hydrocarbon reactant comprises any suitable carbon number olefin compound or any carbon number olefin compound disclosed herein, e.g., a $C_2$ to $C_{36}$ olefin compound, a $C_2$ to $C_{18}$ olefin compound, a $C_2$ to $C_{12}$ olefin compound, or a $C_2$ to $C_8$ olefin compound; and/or the hydrocarbon reactant comprises any suitable carbon number aromatic compound or any carbon number aromatic compound disclosed herein, e.g., a $C_6$ to $C_{36}$ aromatic compound, a $C_6$ to $C_{18}$ aromatic compound, a $C_6$ to $C_{12}$ aromatic compound, or a $C_6$ to $C_8$ aromatic compound.

Aspect 75. The process defined in any one of aspects 1-69, wherein the hydrocarbon reactant comprises methane, ethane, propane, butane (e.g., n-butane or isobutane), pentane (e.g., n-pentane, neopentane, cyclopentane, or isopentane), hexane, heptane, octane, nonane, decane, undecane, dodecane, tridecane, tetradecane, pentadecane, hexadecane, heptadecane, octadecane, or any combination thereof; or the hydrocarbon reactant comprises methane, ethane, propane, n-butane, isobutane, n-pentane, neopentane, isopentane, n-hexane, n-heptane, n-octane, n-decane, n-dodecane, or any combination thereof, or the hydrocarbon reactant comprises methane, ethane, propane, butane, pentane, hexane, or any combination thereof.

Aspect 76. The process defined in any one of aspects 1-69, wherein the hydrocarbon reactant comprises ethylene, propylene, 1-butene, 1-pentene, 2-pentene, 1-hexene, 1-heptene, 1-octene, 1-decene, 1-dodecene, 1-tetradecene, 1-hexadecene, 1-octadecene, cyclopentene, cyclohexene, or any combination thereof.

Aspect 77. The process defined in any one of aspects 1-69, wherein the hydrocarbon reactant comprises benzene, toluene, ethylbenzene, xylene, styrene, mesitylene, or any combination thereof.

Aspect 78. The process defined in any one of aspects 1-69, wherein the hydrocarbon reactant comprises a $C_n$ hydrocarbon compound, the alcohol compound comprises a $C_{n+1}$ alcohol compound, and the carbonyl compound comprises a $C_{n+1}$ carbonyl compound.

Aspect 79. The process defined in aspect 78, wherein n is any suitable integer or an integer in any range disclosed herein, e.g., from 1 to 36, from 1 to 18, from 1 to 12, or from 1 to 8.

Aspect 80. The process defined in any one of aspects 1-69, wherein the hydrocarbon reactant comprises ethylene (or propane/propylene, or butane/1-butene), and the carbonyl compound comprises cyclopentanone (or butanal, or pentanal).

Aspect 81. The process defined in any one of aspects 1-80, wherein the wavelength comprises a single wavelength or a range of wavelengths in the visible spectrum (from 380 nm to 780 nm).

Aspect 82. The process defined in any one of aspects 1-80, wherein the wavelength comprises a single wavelength or a range of wavelengths in the 200 nm to 750 nm range.

Aspect 83. The process defined in any one of aspects 1-80, wherein the wavelength comprises a single wavelength or a range of wavelengths in the 300 to 750 nm range, the 350 nm to 650 nm range, the 300 nm to 500 nm range, or the 300 nm to 400 nm range.

Aspect 84. The process defined in any one of aspects 1-80, wherein the wavelength comprises a single wavelength or a range of wavelengths below 600 nm, below 500 nm, below 475 nm, below 450 nm, below 430 nm, or below 420 nm.

Aspect 85. The process defined in any one of aspects 1-84, wherein the wavelength is a single wavelength.

Aspect 86. The process defined in any one of aspects 1-84, wherein the wavelength is a range of wavelengths spanning at least 25 nm, at least 50 nm, at least 100 nm, or at least 200 nm.

Aspect 87. The process defined in any one of the preceding aspects, wherein the light beam has any suitable intensity or an intensity in any range disclosed herein, e.g., at least 500 lumens, at least 1000 lumens, at least 2000 lumens, at least 5000 lumens, at least 10,000 lumens, or at least 20,000 lumens.

Aspect 88. The process defined in any one of the preceding aspects, wherein the light beam is from a light source having any suitable power or any power disclosed herein, e.g., at least 50 watts, at least 100 watts, at least 200 watts, at least 500 watts, at least 1,000 watts, or at least 2,000 watts.

Aspect 89. The process defined in any one of the preceding aspects, wherein the supported chromium catalyst is irradiated with any suitable illuminance or any illuminance disclosed herein, e.g., at least 1000 lux, at least 2000 lux, at least 5000 lux, at least 10,000 lux, at least 20,000 lux, at least 50,000 lux, or at least 100,000 lux; additionally or alternatively, less than or equal to 250,000 lux, less than or equal to 200,000 lux, less than or equal to 150,000 lux, or less than or equal to 125,000 lux.

Aspect 90. The process defined in any one of the preceding aspects, wherein the light beam is from a blue light source or a UV light source.

Aspect 91. The reaction product comprising the alcohol compound and/or the carbonyl compound (e.g., a ketone or aldehyde compound) formed by the process defined in any one of the preceding aspects.

Aspect 92. The reaction product comprising cyclopentanone formed by the process defined in any one of the preceding aspects.

Aspect 93. A composition comprising cyclopentanone and at least one of the following compounds:

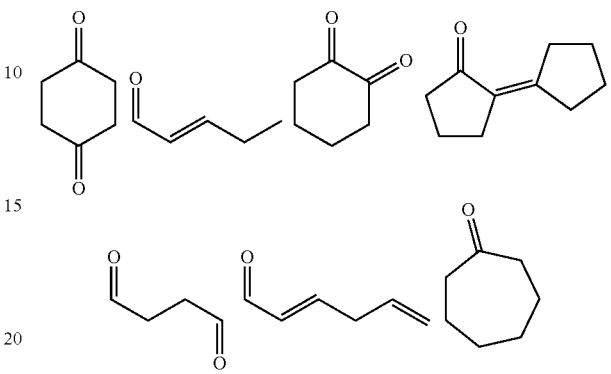

Aspect 94. A process comprising:
performing the process defined in any one of aspects 1-90, wherein the hydrocarbon reactant comprises ethylene, and the carbonyl compound comprises cyclopentanone;
oxidizing the cyclopentanone to form valerolactone; and
polymerizing valerolactone to form a polyester.

Aspect 95. The polyester prepared by the process defined in aspect 94.

Aspect 96. A process comprising:
performing the process defined in any one of aspects 1-90, wherein the hydrocarbon reactant comprises ethylene and wherein instead of removing,
contacting the treated chromium catalyst (or the reduced chromium catalyst) and an optional co-catalyst with ethylene and an optional olefin comonomer in a polymerization reactor system under polymerization reaction conditions to produce an ethylene polymer.

Aspect 97. The process defined in aspect 96, wherein the ethylene polymer comprises a terminal C=O group.

Aspect 98. An ethylene polymer comprising a terminal C=O group.

Aspect 99. The process or polymer defined in in any one of aspects 96-98, wherein the ethylene polymer comprises an ethylene homopolymer.

Aspect 100. The process or polymer defined in in any one of aspects 96-99, wherein the ethylene polymer comprises an ethylene/α-olefin copolymer.

Aspect 101. The process or polymer defined in in any one of aspects 96-100, wherein the ethylene polymer comprises an ethylene/1-butene copolymer, an ethylene/1-hexene copolymer, and/or an ethylene/1-octene copolymer.

Aspect 102. A process comprising:
performing the process defined in any one of aspects 1-90, wherein the hydrocarbon reactant comprises ethylene, and wherein instead of removing,
contacting the treated chromium catalyst (or the reduced chromium catalyst) and an optional co-catalyst with ethylene in a polymerization reactor system under polymerization reaction conditions to produce an ethylene/carbon monoxide copolymer.

Aspect 103. The ethylene/carbon monoxide copolymer produced by the process defined in aspect 102.

We claim:

1. A process comprising:
   (a) contacting a hydrocarbon reactant, carbon monoxide, and a supported chromium (II) catalyst to form a treated chromium catalyst; and
   (b) removing from the treated chromium catalyst a reaction product comprising an alcohol compound and/or a carbonyl compound.

2. The process of claim 1, wherein step (a) comprises contacting the hydrocarbon reactant, the carbon monoxide, and the supported chromium catalyst (II) catalyst while irradiating with a light beam at a wavelength in the UV-visible spectrum to form the treated chromium catalyst.

3. The process of claim 1, wherein the process further comprises a step of subjecting the treated chromium catalyst to an oxidizing atmosphere after step (a) and before step (b).

4. The process of claim 3, wherein step (a) comprises contacting the hydrocarbon reactant, the carbon monoxide, and the supported chromium catalyst (II) catalyst while irradiating with a light beam at a wavelength in the UV-visible spectrum to form the treated chromium catalyst.

5. The process of claim 3, wherein:
   the oxidizing atmosphere comprises air; and
   a molar ratio of elemental oxygen in the oxidizing atmosphere to chromium of the supported chromium (II) catalyst is at least 10:1.

6. The process of claim 1, wherein the hydrocarbon reactant comprises a $C_1$ to $C_8$ alkane compound, a $C_2$ to $C_{12}$ olefin compound, a $C_6$ to $C_{12}$ aromatic compound, or any combination thereof.

7. The process of claim 1, wherein the hydrocarbon reactant comprises ethylene, and the carbonyl compound comprises cyclopentanone.

8. The process of claim 1, wherein:
   the supported chromium (II) catalyst comprises a solid oxide, a chemically-treated solid oxide, a zeolite, or a combination thereof; and
   the supported chromium (II) catalyst has a pore volume from 0.1 to 5 mL/g and a BET surface area from 50 to 2000 $m^2$/g.

9. The process of claim 8, wherein the supported chromium (II) catalyst contains from 0.01 to 50 wt. % chromium, based on the weight of the supported chromium (II) catalyst.

10. The process of claim 1, wherein a molar ratio of the hydrocarbon reactant to the carbon monoxide is from 0.1:1 to 10:1.

11. The process of claim 1, wherein a molar yield of the alcohol compound and/or the carbonyl compound is from 0.1 to 10 moles of the alcohol compound and/or the carbonyl compound per mole of chromium (II) of the supported chromium (II) catalyst.

12. A process comprising:
    performing the process of claim 1, wherein the hydrocarbon reactant comprises ethylene, and the carbonyl compound comprises cyclopentanone;
    oxidizing the cyclopentanone to form valerolactone; and
    polymerizing valerolactone to form a polyester.

13. A process comprising:
    (i) irradiating a hydrocarbon reactant, carbon monoxide, and a supported chromium catalyst comprising chromium in a hexavalent oxidation state with a light beam at a wavelength in the UV-visible spectrum to reduce at least a portion of the supported chromium catalyst to form a reduced chromium catalyst;
    (ii) subjecting the reduced chromium catalyst to an oxidizing atmosphere, wherein:
       the oxidizing atmosphere comprises air; and
       a molar ratio of elemental oxygen in the oxidizing atmosphere to chromium of the reduced chromium catalyst is at least 10:1; and
    (iii) removing from the reduced chromium catalyst a reaction product comprising an alcohol compound and/or a carbonyl compound.

14. The process of claim 13, wherein;
    the light beam is from a blue light source or a UV light source;
    the light beam comprises wavelengths above 350 nm and below 500 nm;
    the hydrocarbon reactant, the carbon monoxide, and the supported chromium catalyst are irradiated with an illuminance of at least 10,000 lux; or
    any combination thereof.

15. The process of claim 14, wherein a molar yield of the alcohol compound and/or the carbonyl compound is from 0.1 to 10 moles of the alcohol compound and/or the carbonyl compound per mole of chromium (VI) of the supported chromium catalyst.

16. The process of claim 13, wherein the hydrocarbon reactant comprises a $C_1$ to $C_8$ alkane compound, a $C_2$ to $C_{12}$ olefin compound, a $C_6$ to $C_{12}$ aromatic compound, or any combination thereof.

17. The process of claim 13, wherein:
    the supported chromium catalyst contains from 0.01 to 50 wt. % chromium, based on the weight of the supported chromium catalyst; and
    a molar ratio of the hydrocarbon reactant to the carbon monoxide is from 0.1:1 to 10:1.

18. The process of claim 13, wherein the hydrocarbon reactant comprises ethylene, and the carbonyl compound comprises cyclopentanone.

19. A process comprising:
    (a) contacting ethylene, carbon monoxide, and a supported chromium (II) catalyst to form a treated chromium catalyst; and
    (b) contacting the treated chromium catalyst and an optional co-catalyst with ethylene and an optional olefin comonomer in a polymerization reactor system under polymerization reaction conditions to produce an ethylene polymer.

20. A process comprising:
    (a) contacting ethylene, carbon monoxide, and a supported chromium (II) catalyst to form a treated chromium catalyst; and
    (b) contacting the treated chromium catalyst and an optional co-catalyst with ethylene in a polymerization reactor system under polymerization reaction conditions to produce an ethylene/carbon monoxide copolymer.

* * * * *